United States Patent [19]
Ichimura

[11] Patent Number: 5,926,605
[45] Date of Patent: Jul. 20, 1999

[54] DATA STORAGE DEVICE AND DATA STORAGE/PLAYBACK DEVICE

[75] Inventor: Satoshi Ichimura, Nakai-machi, Japan

[73] Assignee: Fuji Xerox Co., Ltd., Tokyo, Japan

[21] Appl. No.: 08/847,338

[22] Filed: Apr. 23, 1997

[30] Foreign Application Priority Data

Apr. 24, 1996 [JP] Japan ..................................... 8-127891

[51] Int. Cl.⁶ ..................................................... H04N 5/91
[52] U.S. Cl. ........................... 386/69; 386/112; 386/124; 360/72.1
[58] Field of Search .................................. 386/6, 33, 68, 386/69, 70, 109, 111, 112; 360/72.1, 72.3, 72.2

[56] References Cited

U.S. PATENT DOCUMENTS 5,428,393  6/1995  Enokida ................................... 348/390
5,613,032  3/1997  Cruz et al. .................................. 386/69

Primary Examiner—Wendy Garber
Assistant Examiner—Christopher Onuaku
Attorney, Agent, or Firm—Oliff & Berridge, PLC

[57] ABSTRACT

A method and apparatus is provided that reliably saves sections of sounds and images believed to be important by associating the sounds and images with user input, changes in sounds, and changes in images. A condition-matching interval detecting device takes audio data or image data from a data input device and detects a condition-matching interval that matches prescribed conditions set beforehand. The incoming audio data or incoming image data is associated with data indicating the condition-matching interval and is stored temporarily in a temporary storing device. If the user-input detecting device detects user-input data, a sequence from the audio data or the image data stored temporarily in temporary storing device is stored in time-series data storing device, the sequence beginning at least from the start of a condition-matching interval. The association between the user-input data and the memory position within time-series data storing device of the audio data or the image data corresponding to the user-input data is stored in an association storing device.

16 Claims, 30 Drawing Sheets

■ MEMORY IN WHCH IMAGES CONTAINING A STATEMENT ARE STORED
• MEMORY IN WHCH IMAGES CONTAINING NO STATEMENT ARE STORED
☐ MEMORY IN WHICH NO IMAGES ARE STORED

■ MEMORY IN WHCH IMAGES CONTAINING A STATEMENT ARE STORED
• MEMORY IN WHCH IMAGES CONTAINING NO STATEMENT ARE STORED
☐ MEMORY IN WHICH NO IMAGES ARE STORED

| IDENTIFIER | ENTERED KEYWORD STRING | KEYWORD INTERVAL |
|---|---|---|
| 1 | "SUMMARY" | 3 |
| 2 | "CONCLUSION | 5 |
| 3 | "IMPORTANT" | 10 |
| 4 | "HOMEWORK" | 3 |
| : | : | : |

■ MEMORY IN WHICH IMAGES ARE STORED
□ MEMORY IN WHICH IMAGES ARE NOT STORED

| IDENTIFIER | ENTERED PATTERNS | | PATTERN INTERVAL |
| --- | --- | --- | --- |
| | NAME OF PATTERN | EVALUATION RESULT FROM EVALUATION SECTION | |
| 1 | "MURMURING" | A | 3 |
| 2 | "LAUGHTER" | B | 5 |
| 3 | "APPLAUSE" | C | 10 |
| 4 | "NOISE" | D | 3 |
| ⋮ | ⋮ | ⋮ | ⋮ |

FIG.28

DATA STORAGE DEVICE AND DATA STORAGE/PLAYBACK DEVICE

BACKGROUND OF THE INVENTION

1. Field of the Invention

The present invention relates to a data storage device which can function as a meeting recording system, an interview recording system, or the like, storing data such as conversations from meetings and interviews, images from a meeting or an interview, and related data such as meeting notes and interview notes.

2. Description of Related Art

Conventionally, there have been proposed devices that use digital disks, digital still cameras, videotapes, semiconductor memory, and the like to store and playback data such as conversations from meetings, lectures, interviews, telephones, and videophones, as well as video images, images from monitoring cameras, and the like. Compared to having a reporter manually write down only the important points of the information to be recorded, the use of such data storage devices has the advantage of allowing voices and images to be recorded completely without omissions.

These devices can involve: recording digital signals sent via a computer network onto a storage medium; recording analog input signals from a video camera or a microphone directly to a storage medium; or encoding and converting such analog signals into digital signals.

However, these devices had a problem in that desired sections from the recorded voices or images could not be quickly searched.

To overcome this problem, tape recorders and videotape recorders have been proposed that allow easy searching of important sections by adding check-marks to important sections in the incoming audio signals or incoming image signals.

However, these check-marks only serve to specify the position of important sections. It is not possible to indicate which section of the audio signal or the image signal corresponds to each check-mark. Thus, all the audio or image signals that have been check-marked must be played back to determine the contents. Furthermore, it is also necessary to perform the awkward operation of pressing a button while someone is talking, thus distracting the user from the statement taking place.

For these reasons, there have been proposed devices in which audio signals or image signals that are input continuously are stored and played back so that they are associated with user-input data that has been entered via a pen or a keyboard by the user at selected points in time. By using such devices, the audio signal or the image signal can be recorded while the person making the recording performs pen or keyboard input in the same way that a reporter would take notes. By referring to the entered notes later, the portions of the audio or image signal to be played back can be easily selected and played back.

For example, in Japanese laid-open publication number 7-182365, Japanese laid-open publication number 6-176171, Japanese laid-open publication number 6-343146, ACM CHI '94 Proceedings pgs. 58–64 ("Marquee: A Tool for Real-Time Video Logging") the subject matter of which are incorporated herein by reference, there are proposed devices wherein user-input data is associated with audio signals or image signals by using a time stamp. When the data is to be played back, a piece of user-input data displayed on a screen can be specified, and the audio signals or image signals recorded at the same time as the specified user-input data was recorded, can be played back.

Furthermore, in Japanese laid-open publication number 6-276478, the subject matter of which is incorporated herein by reference, there is a proposed device that uses time stamps to associate the continuous audio signals or image signals with still images from specific points in time indicated by the person making the recording.

In Japanese laid-open publication number 6-205151, the subject matter of which is incorporated herein by reference, there is disclosed a device that records audio signals or image signals while adding an index whenever user input has been interrupted for a fixed period of time. When playback is to be performed, user-input data displayed on a screen can be specified, and the audio signals or image signals from the index section corresponding to the specified user-input data is played back.

However, in the data storage devices disclosed in the aforementioned Japanese laid-open publication number 7-182365, Japanese laid-open publication number 6-176171, 6-205151, ACM CHI'94 Proceedings pgs. 58–64 ("Marquee: A Tool for Real-Time Video Logging"), and Japanese laid-open publication number 6-276478, the audio signals or image signals that are input are recorded in their entirety without compression. Thus, it is difficult to record audio or image signals over a long period of time in limited storage space. This is because an enormous amount of storage capacity is required to be able to record long periods of time-series data such as continuously incoming audio signals or image signals.

Among known methods, there has been proposed a method of continuously compressing audio signals and image signals while storing them in a storage medium as well as a method of storing audio signals that does not record silent intervals. Generally, however, all recorded audio signals and image signals are stored with the same compression ratio. For this reason, it is not possible to have only the important sections played back at high audio/image quality.

For example, when recording sounds and images from a long interview using Video for Windows ("Microsoft Video for Windows 1.0 Users Guide", pp. 57–59, pp. 102–108), the subject matter of which is incorporated herein by reference, the dropped-frame compression ratio can be set to conserve storage capacity by recording only one frame from the image signal every five seconds. When the user later wants to play back sections that were thought to be important during the recording, motions made by the speaker (gestures), mannerisms, and subtle nuances may be lost because only one frame of the image signal was recorded every five seconds. Conversely, if the image signals are recorded at 30 frames per second over the entire interview, the required storage capacity will be very large, and the recording of a long interview would be extremely difficult.

In Japanese laid-open publication number 6-343146, there is disclosed a method for recording signals for a fixed interval based on the timing of inputs from the user. However, in this method, the data that can be played back is rigidly restricted to the signals within the fixed intervals. Thus, for example, if audio and image signals from an interview are being recorded, it would be possible to play back only the audio and image signals within the fixed intervals determined by the timing of inputs from the user. The sounds and images from the portions outside of these fixed intervals cannot be played back at all.

Also, since there is no relation between the sounds and user input, it is possible that the recording could miss the beginning of a statement from the speaker or the recording could be halted before the speaker has finished talking.

In Japanese laid-open publication number 6-153199, the subject matter of which is incorporated herein by reference, there is described a monitoring device which, when a trigger signal from a sensor is detected, a prescribed number of image frames before and after the detection of the trigger signal is recorded. This monitoring camera device stores images in a similar manner as the device described in Japanese laid-open publication number 6-343146, starting at a fixed interval before a trigger signal is detected and ending at a fixed interval after the trigger signal is detected.

However, if sounds and images from an interview are to be recorded with the device, the user inputs (the trigger signal) would be generated at an undetermined period of time after the speaker has begun talking. Thus, even with the monitoring camera device technology described in Japanese laid-open publication number 6-153199, where an interval of a prescribed number of frames before and after a trigger is recorded, the recording may miss the initial portion of the speaker's talking, or the recording could be stopped before the speaker has finished as in Japanese laid-open publication number 6-343146.

SUMMARY OF THE INVENTION

The present invention overcomes the problems described above. The object of the present invention is to provide a data storage device that associates user input, changes in sounds, and changes in images, and that reliably records and stores the portions of the sounds and images that may be important.

A data storage device may be provided having a user-input device, a detecting device detecting user-input data detecting user-input data sent from the user inputting device and a storing device for storing user-input data from the user-input device detected by the detecting device.

An input device may be provided for inputting audio data or image data to be stored. A detecting device detects intervals in which the audio data or image data from the input device fulfill prescribed conditions set beforehand.

A temporary storage device stores the associated audio data or the image data with the intervals detected by the detecting condition-fulfilling intervals.

A time-series data storage device takes audio data or image data in an interval from audio data or image data temporarily stored in a temporary storage device. The interval is determined by the detection results from a detecting device and the detection results from the user-input data from the user-input data device.

A correspondence-relation storing device stores associations between the user-input data and a storage position in the time-series data storage device of the audio data or the image data received when the user-input data was detected by the detecting user-input data detecting device.

When user-input data is detected by means for detecting user-input data device, the audio data or image data stored in the time-series data storing device comprises a sequence of data from the audio data or image data temporarily stored in the temporary storing device, wherein the sequence of data begins at least from the start of an interval detected by the condition-matching interval detection device that occurs before the detection of the user-input data.

There is disposed a compression device compressing the amount of audio data or image data stored in the storing time-series data storing device. The compression method or the compression ratio of the compression device can be varied.

The audio data or the image data within intervals detected by the detecting condition-matching intervals device is compressed by the compression device using a different compression method or compression ratio than that used for the audio data or image data from other intervals.

Audio data or image data from the input device is temporarily stored in the temporary storage device in association with intervals detected by condition-matching intervals detecting device based on prescribed conditions set beforehand. When user input is detected by the user input detecting device, an audio data interval or an image data interval to be stored in the time-series data storage device corresponding to the user-input data is determined based not only on the point in time at which the user-input data was detected but also on the detection output from the condition-matching intervals detecting device.

The audio data or image data associated with user-input data when it is saved to the time-series data storage device is as follows: the audio data or image data beginning at least from the start of an interval detected by the condition-matching intervals detecting device before the user-input data was detected.

For example, the detection condition of the condition-matching intervals detecting device may be based on "statement intervals". In this case, the statements of a speaker in a meeting or the corresponding image data from before the user-input data is detected would be considered to correspond to the user-input data and would be stored from beginning to end in the time-series data storage device. Also, the associations would be stored in correspondence relations storage device.

The audio data or image data from intervals detected the condition-matching intervals detecting device would be stored in the time-series data storage device in a different manner, e.g. at a higher quality, compared to audio data or image data from other intervals.

Thus, when the data is played back, the contents of user-input data storage device can be displayed on a display device. By indicating directly or indirectly a specific piece of user-input data, the audio data or image data corresponding to the user-input data can be read and played back from the time-series data storage device based on the relationship of correspondence stored in correspondence relations storage device.

As described above, the detection condition for the condition-matching intervals detecting device could be based on "statement intervals". In such cases, the audio data or image data that is played back would consist of the speech or image data within the statement interval, which could begin from before the user-input data is entered. Thus, the speaking would begin from the beginning of this interval, and the corresponding image data would be played back from the start of the speaking. Also, the audio data and image data from the condition-matching interval would be played back at a higher quality than that of other intervals.

BRIEF DESCRIPTION OF THE DRAWINGS

The invention will be described with reference to the following drawings in which like reference numerals refer to like elements and wherein:

FIG. 28 illustrates the patterns entered beforehand in the fifth embodiment;

DETAILED DESCRIPTION OF PREFERRED EMBODIMENTS

In the first embodiment, the data storage/playback device of the present invention is implemented for the recording of meetings.

Figure 2:
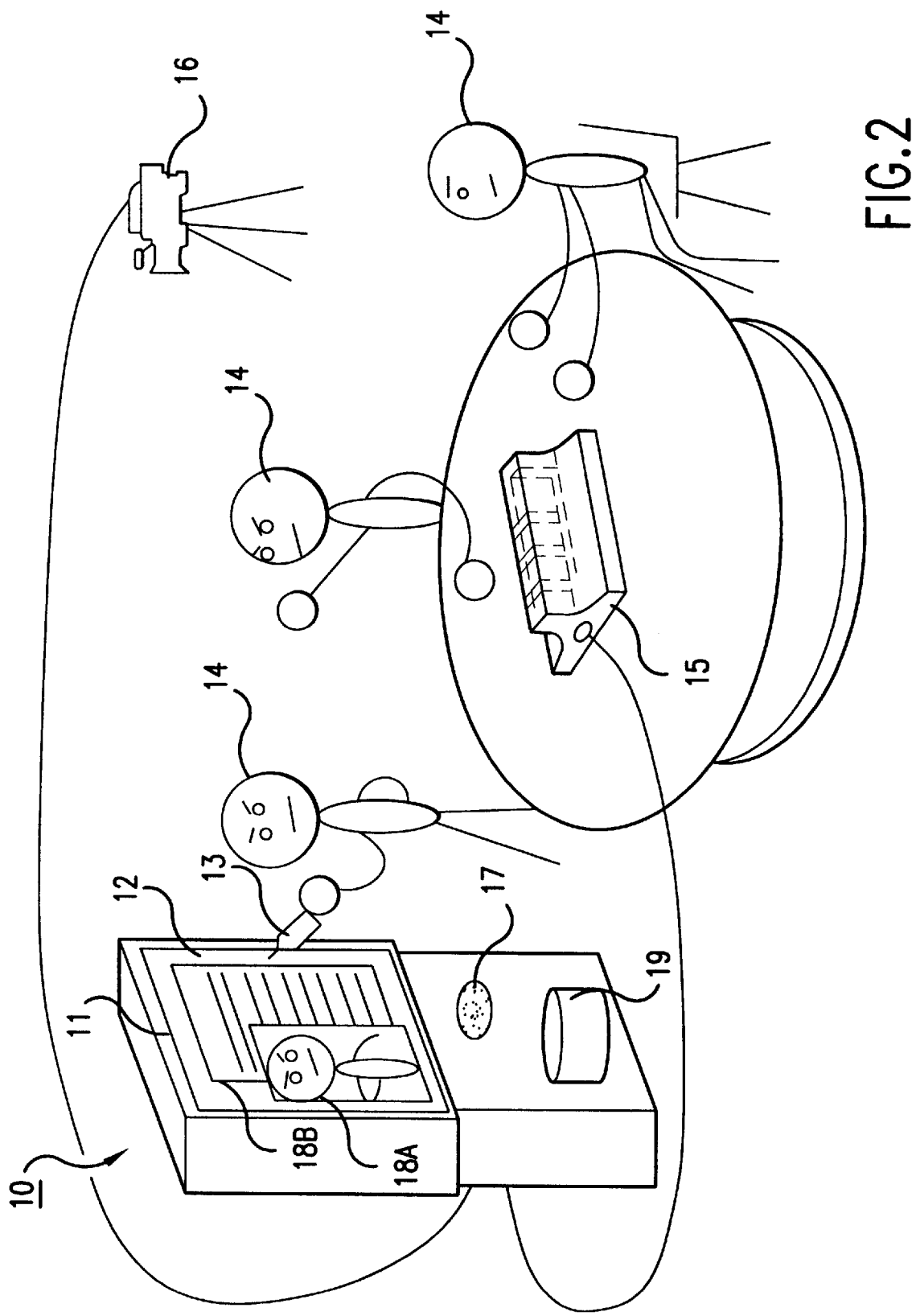
FIG. 2 is a schematic drawing illustrating a system in which an embodiment of the present invention is implemented.

FIG. 2 shows a setting for a meeting in which this embodiment would be used. An electronic meeting device 10, in which an electronic pen is used to write onto a projector screen in the same way as a marker would be used to write on a whiteboard, is shown. The device allows information relating to the meeting, conclusions, and the like to be stored as electronic files. Thus, electronic meeting device 10 is internally equipped with a personal computer (not shown).

It is also possible to connect the device to a network using ISDN via a personal computer. This allows the audio data and image data from the meeting to be shared simultaneously with a remote site. This provides an environment which gives an illusion that the meeting is being conducted in a single room.

Electronic meeting device 10 comprises a display screen 11. The display on the screen of display screen 11 is a projection display, in which images are displayed on the screen by projecting from the back.

In this case, a touch panel 12 is adhesed to display screen 11. Touch panel 12 detects handwritten input data entered by a user 14 using electronic pen 13. The output from touch panel 12, i.e. the output from detection of user-input data, is the coordinate position of the contact input from electronic pen 13 on display screen 11. This output from the detection of user-input data will be processed by the personal computer and stored in memory, as described later.

Electronic meeting device 10 also includes an audio input terminal and a video input terminal. In this embodiment, the voices from a plurality of meeting attendees are picked up by microphone 15 and the resulting audio signal is sent through the audio input terminal. Also, a video camera 16 picks up the meeting setting and documents, and the resulting image signals are sent through the video input terminal.

The audio data received through the audio input terminal is played by a speaker 17 and is also processed by the internal personal computer as described below and is stored in memory in association with the user-input data and image data.

Referring to FIG. 2, the image data from the video camera connected to the video input terminal of electronic meeting device 10 and the image of electronic text sent via the personal computer in the electronic meeting device are displayed on the display screen of electronic meeting device 10 in separate window images 18A, 18B. The image data displayed on display screen 11 is also stored in memory in association with the user-input data and audio data described above.

The personal computer inside electronic meeting device 10 contains a data storage/playback device. This data storage/playback device saves the user-input data, audio data, and image data described above and saves and plays back the data in the manner described below. In FIG. 2, a data storage section 19 is shown.

Figure 1:
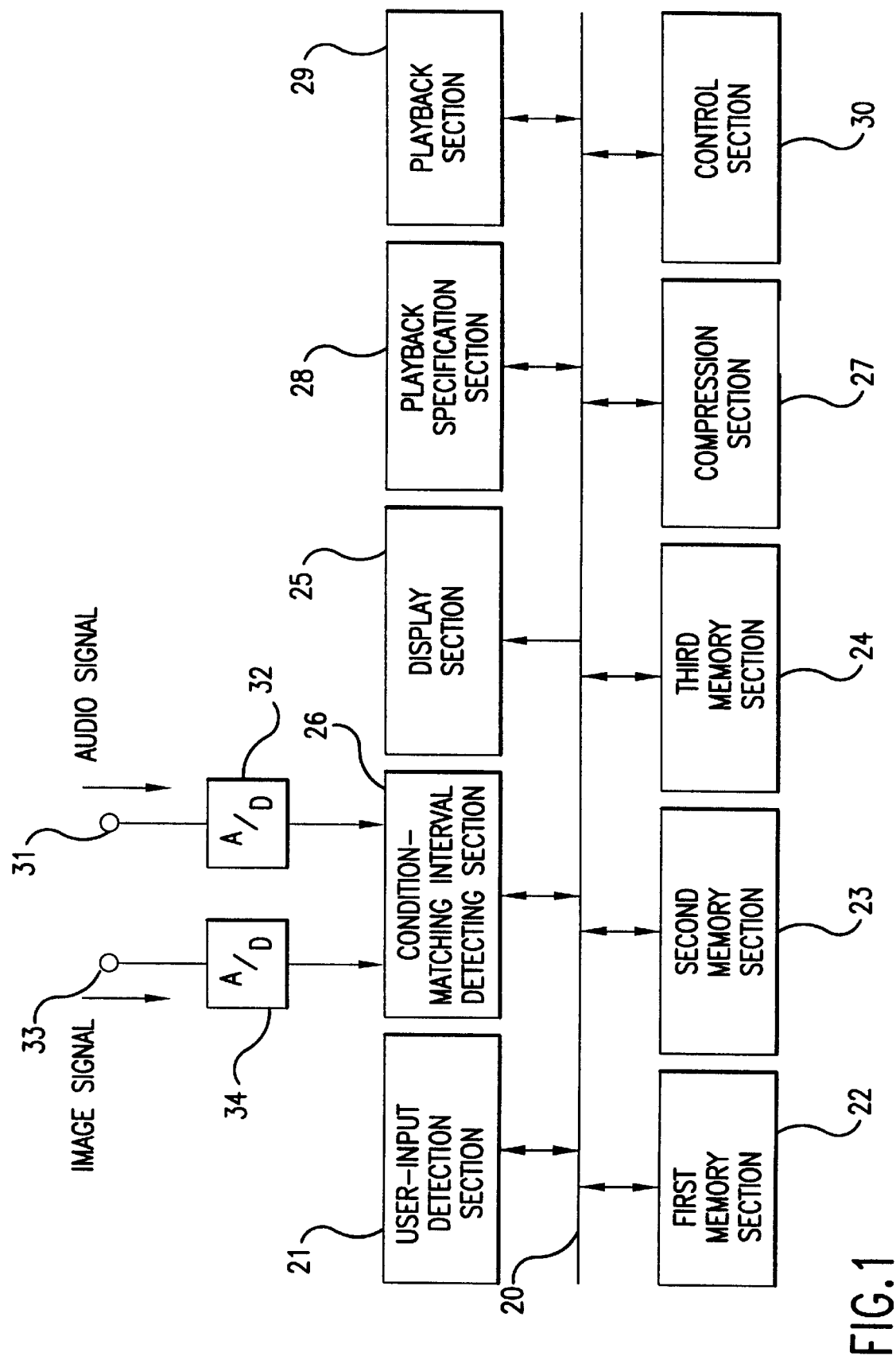
FIG. 1. is a block diagram showing the overall structure of an embodiment of the present invention.

FIG. 1 is a block diagram of the data storage/playback device of this embodiment, indicating the different functions of the device. In the data storage/playback device of this embodiment, a system bus 20 is connected to a user-input data detecting section 21, a first memory section 22, a second memory section 23, a third memory section 24, a display section 25, a condition-matching interval detection section 26, a compression section 27, a playback specifying section 28, a playback section 29, and a control section 30.

Each section can be configured as separate blocks, or a single block can be configured to contain more than one section. Also, it is possible to have a single section mounted as more than one block.

Display section 25 is the projection-type display device described above.

Control section 30 controls overall operations.

User-input data detecting section 21 includes tablet 12 that detects user input from electronic pen 13 and the pen data is output as user-input data.

Besides handwriting and geometrical figures (objects such as lines, rectangles, circles) entered from a pen (or mouse, trackball, touch panel, or the like) user-input data can also include coded data based on character recognition of handwriting data, coded data from a keyboard, or the like. Other acceptable forms of user-input data include user-input data that does not need to be displayed. Examples include: editing data indicating moving/copying/cutting of displayed user-input data; data indicating that a page change has occurred; data indicating that the shutter of a still camera has been pressed; and data indicating the use of a virtual eraser. In these cases, a prescribed symbol indicating the presence of user-input data is displayed on display section 25.

Thus, the user can make inputs to a computational device while time-series data (such as audio or image data) is present. Both of these types of inputs fall under the category of user-input data referred to in the present invention.

Figure 3:
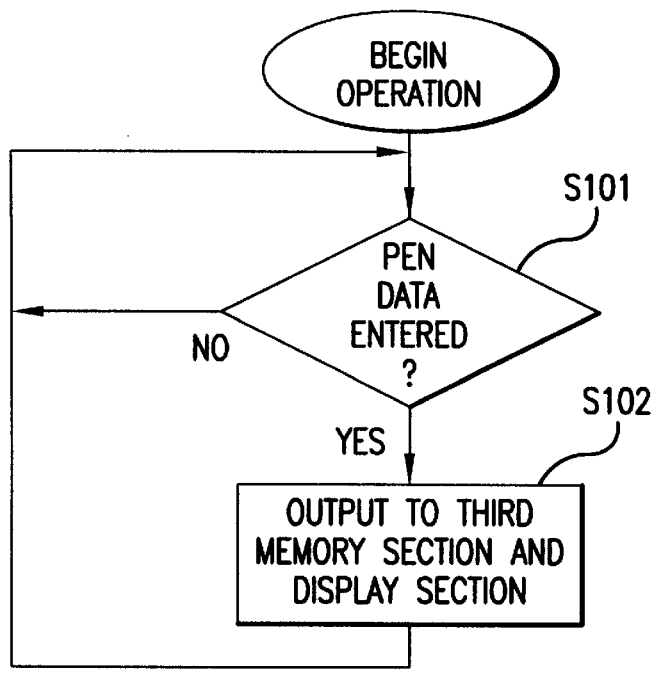
FIG. 3 is a flowchart of the operation of the user-input data detection section of the first embodiment.

FIG. 3 is a flowchart describing the operation of user-input data detecting section 21. When tablet 12 detects user input such as handwriting data from a pen (step S101), the data from the detection result is output and displayed to display section 25 and is also sent to third memory section 24 (step S102).

First memory section 22 is the memory section in which audio data and image data are ultimately stored. First memory section 22 can use a recording medium such as disk recording media or semiconductor memory.

Second memory section 23 includes a correspondence-relation memory section, in which each piece of user-input data is stored in association with a memory address in first memory section 22 for corresponding audio data and image data stored in first memory section 22. Second memory section 23 also includes semiconductor memory, magnetic disks, or the like.

Third memory section 24 can include semiconductor memory, magnetic disks, or the like. In this embodiment, image data is stored temporarily in third memory section 24 before it is stored in first memory section 22. Also, starting and ending point data for condition-matching intervals detected by condition-matching interval detecting section 26 are stored temporarily in third memory section 24 in association with the incoming image data. Third memory section 24 receives the user-input detection output from user-input data detecting section 21 and, as described later, sends the image data that was temporarily stored, in this example, to first memory section 22 via compression section 27.

An audio input signal from input terminal 31 is converted by an A/D converter 32 into a digital signal and sent to condition-matching interval detection section 26. Also, an image signal from input terminal 33 is converted by an A/D converter 34 into a digital signal and sent to condition-matching interval detection section 26.

Condition-matching interval detection section 26 monitors the audio signal or image signal it receives and detects audio signal intervals or image signal intervals that fulfill conditions determined beforehand.

In this embodiment, condition-matching intervals are detected based on the condition of whether audio signals at a prescribed level or higher are present. With this condition, the interval from the start to the end of a statement by a meeting attendee is detected as a condition-matching interval.

Figure 5:
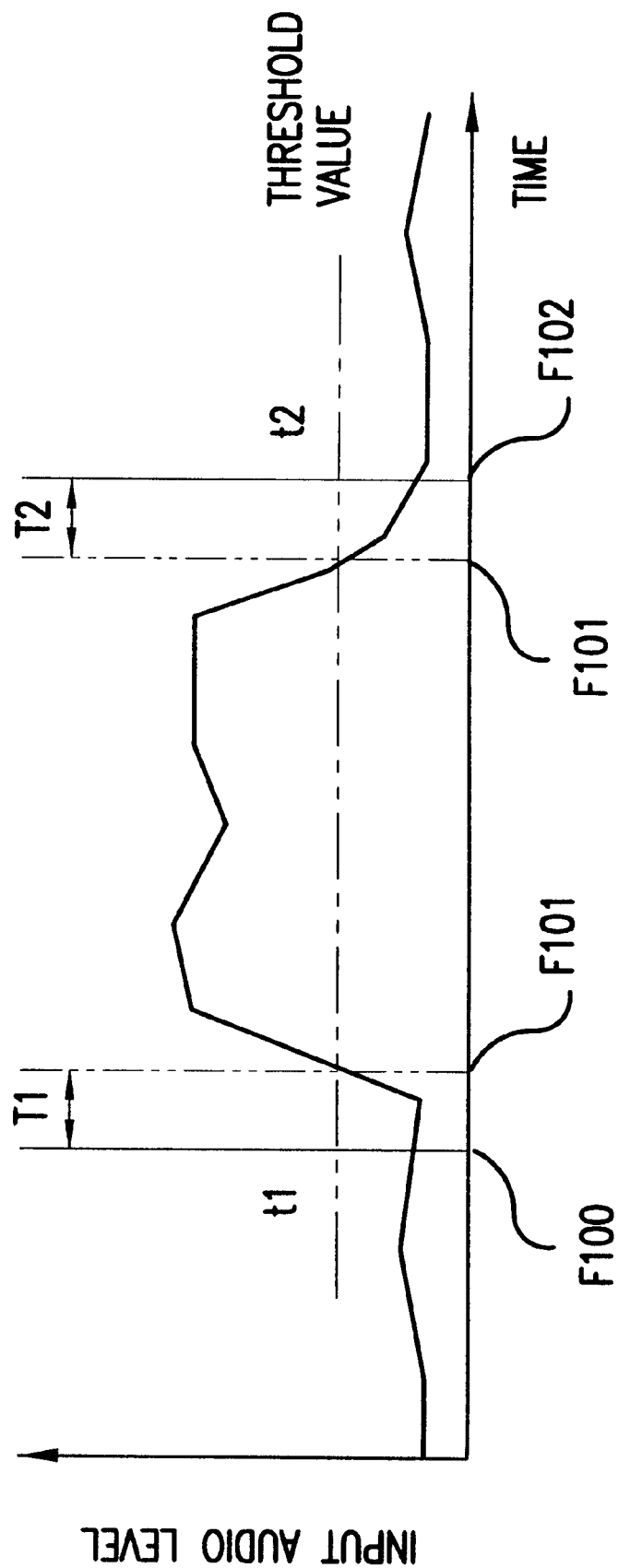
FIG. 5 is a drawing describing the detection operation of the condition-matching interval detection section of the first embodiment.

Referring to FIG. 5, detection in this case is performed by having condition-matching interval detecting section 26 recognize the start of a statement from a speaker when the input audio level is at or higher than a prescribed level. The end of a speaker's statement is detected when the audio level is at or below a prescribed threshold level. However, as shown in FIG. 5, if the start and end of a statement is assumed to be at audio level transition points F101, where the audio level and the threshold level intersect, the initial and final portions of the statement will not be recorded. Thus, the starting point of the statement is set to a point F100, which precedes transition point F101 (when the audio level is changing from a low level to a high level) by a fixed interval T1. The end point of the statement is set to a point F102, which follows transition point F101 (when the audio level is changing from a high level to a low level) by a fixed interval T2.

In this embodiment, the audio level at a point in time is considered to be the "evened-out" value of the audio levels before and after that point in time. For example, the average value of the instantaneous audio levels for the two seconds before and after the point in time can be used.

In this embodiment, condition-matching interval detection section 26 has no conditions set for the image signals. The image data passes through condition-matching interval detection section 26 unchanged and is sent to third memory section 24, which serves as a temporary storage section.

In this embodiment, compression section 27 performs data compression of image data. In this case, compression section 27 is configured so that it can dynamically vary the amount of data compression based on the data from third memory section 24 indicating condition-matching intervals.

Assuming moving image data is used, compression section 27 in this embodiment handles the moving image data in processing units of prescribed time intervals or prescribed numbers of frames. For example, compression section 27 may perform compression by handling ten consecutive frames as a single unit in an image array. The image data from intervals outside of the condition-matching intervals described above is compressed by dropping frames, where the first frame out of the ten frames in the unit is kept and the data from the other frames are eliminated. On the other hand, with the image data from the condition-matching intervals, all ten frames are stored without performing frame-dropping compression.

Thus, when image data from intervals outside of the condition-matching intervals are played back, there are dropped frames, and the footage will show jerky motions. However, the amount of data is reduced significantly. When image data from the condition-matching intervals are played back, high-quality footage with smooth motions will be played back.

Also, the image data within frames may be compressed using prescribed methods such as vector quantization or the like.

In this embodiment, audio data is stored without compression.

Playback specifying section 28 is used when stored user-input data, audio data, and image data is played back by specifying user-input data. As described later, the user can use tablet 12 to specify a piece of user-input data from the ones displayed on screen 11. Playback specifying section 28 will determine the playback portion from the specified portion.

Playback section 29 reads user-input data from second memory section 23 and plays the data back and displays the data on display 25. Also, the audio data and image data in the playback portion corresponding to the user-input data and specified by playback specifying section 28 is read from first memory section 22 and played back.

The following is a description of the recording operations performed by a data storage/playback device having the structure described above.

Figure 7:
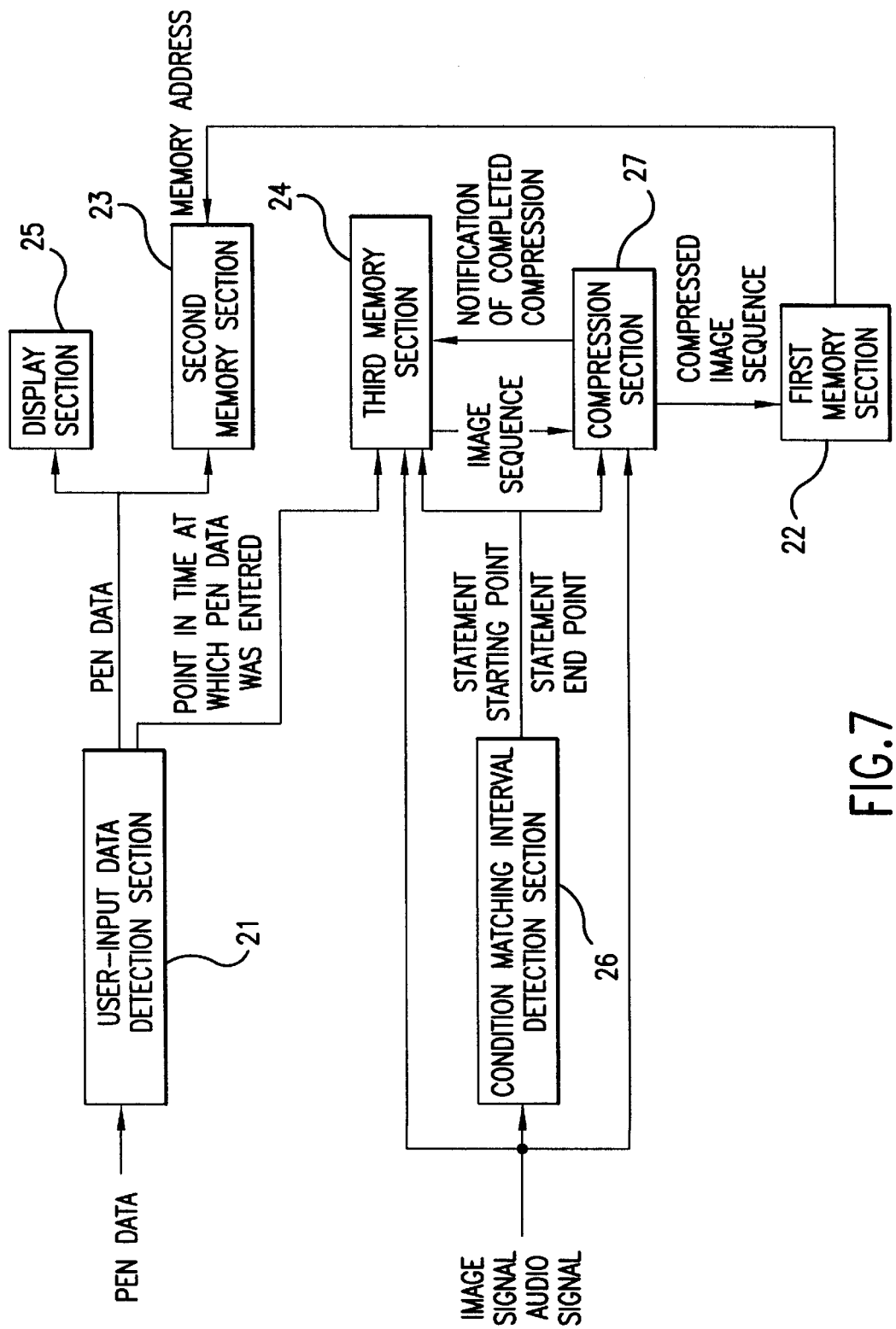
FIG. 7 illustrates the overall flow of operations in the first embodiment.

FIG. 7 is a drawing describing the recording operation of this embodiment, the flow of data involved in the operation, and the flow of output from the various sections.

The audio signal from microphone 15 and the image signal from video camera 16 are sent to condition-matching interval detection section 26. The image signal is sent to third memory section 24 and is temporarily stored, and the audio signal is stored in first memory section 22. In this embodiment, audio data is not compressed so it is directly sent to first memory section 22.

As described above, condition-matching interval detection section 26 compares the audio level of the audio data from microphone 15 with a prescribed threshold level. Based on this, the starting point and end point of a statement by a meeting attendee is detected. The detected starting point and end point data are sent to third memory section 24 and compression section 27.

Figure 4:
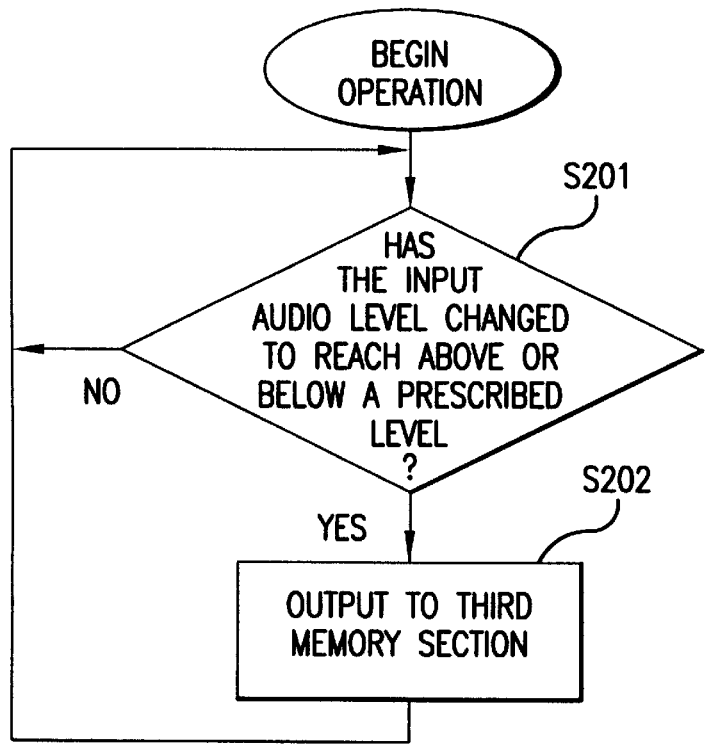
FIG. 4 is a flowchart of the detection operation of the condition-matching interval detection section of the first embodiment.

FIG. 4 is a flowchart describing the operation of condition-matching interval detection section 26. The condition-matching interval detection operation described above is performed at step S201. When the starting point or the end point of a statement from a speaker is detected, the detection result is sent to third memory section 24 and compression section 27 at step S202.

Figure 6:
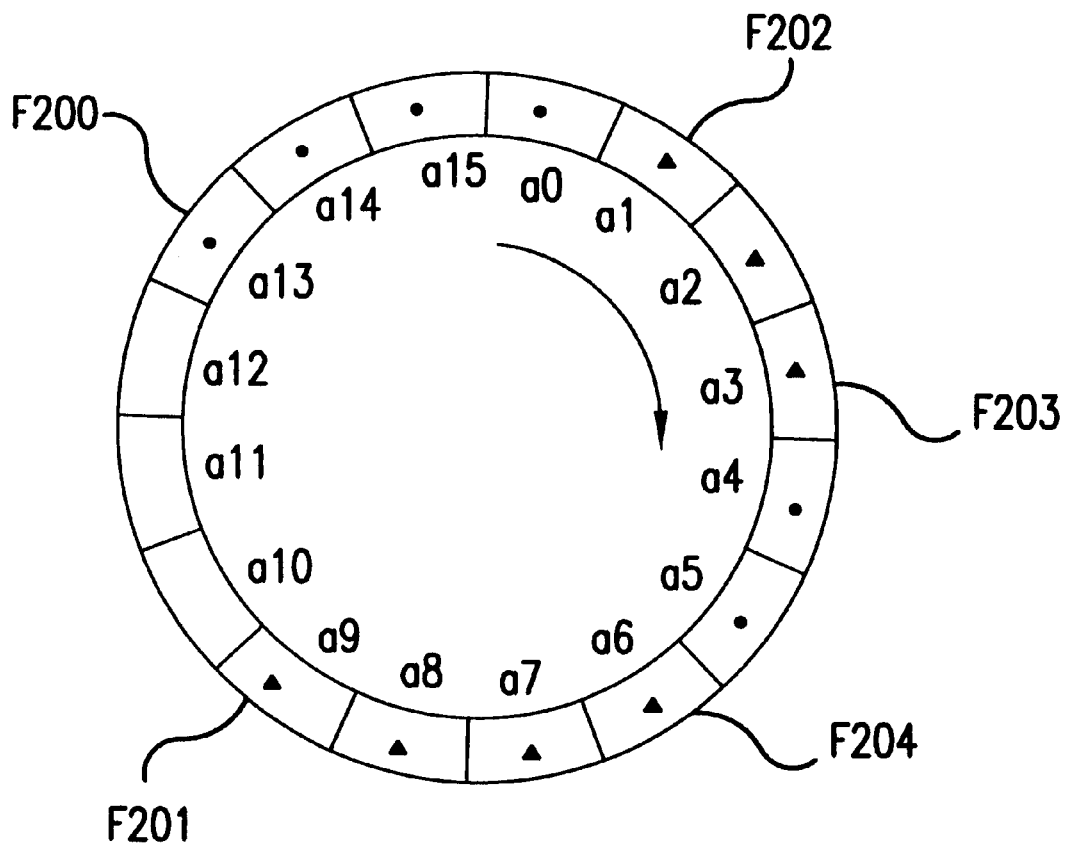
FIG. 6 illustrates an example of a structure for the third memory section in the first embodiment.

Referring to FIG. 6, third memory section 24 is structured as a ring buffer. The image data, which is being continuously received, and the detection results from condition-matching interval detection section 26, i.e. the starting points and end points of statements, are added into the buffer in a ring arrangement by controlling the addresses to which the data is written so that old data is overwritten by new data.

In addition to this method, it would also be possible to use other known methods such as queues, FIFO buffers, and the like. Referring to FIG. 7, the ring buffer shown in the drawing has sixteen units of memory, but there is no restriction in the number of memory units, and there is also no restriction in the number of image frames (data storage capacity) that can be held in one unit of memory.

Referring to FIG. 6, an oldest data address F200 is a pointer that points to the memory location for the oldest image among the images stored in third memory section 24. A newest data address F201 is a pointer that points to the memory location of the newest image in third memory section 24.

Starting points F202, F204 and an end point F203 are based on the detection results from condition-matching interval detection section 26 stored in third memory section 24.

The data indicating the starting points and end points can, as in this example, be stored in the ring buffer memory, or it can be stored in a memory area prepared separately.

Figure 8:
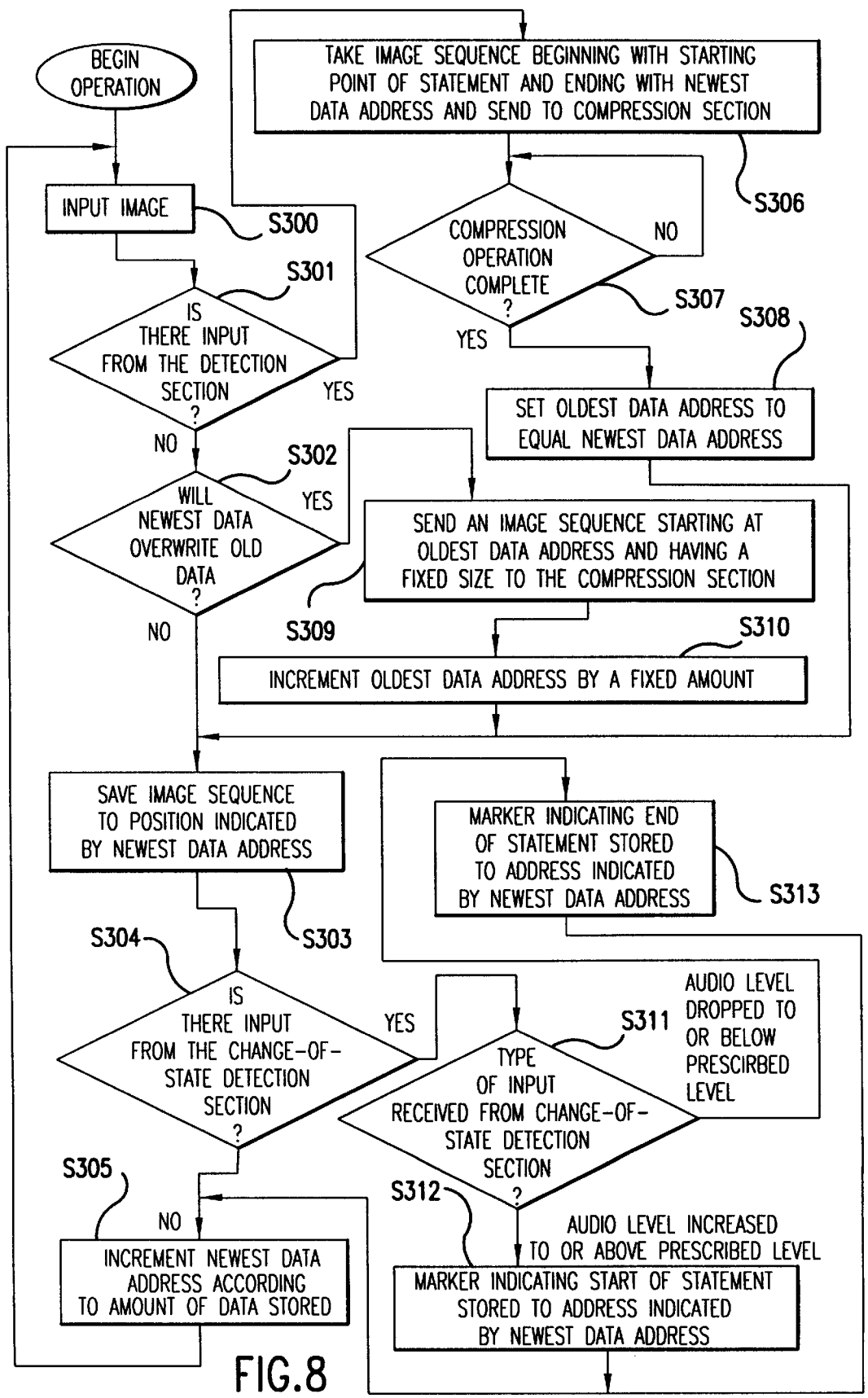
FIG. 8 is a flowchart of the operation of the third memory section of the first embodiment.

FIG. 8 is a flowchart describing the operations of third memory section 24.

At step S300, an image data sequence, e.g. an image data sequence consisting of 10 frames of images, is received over a single time unit. If no detection output from user-input data detection section 21 is received at step S301, and if the newest data does not overwrite the oldest data in the ring buffer at step S302, then the image data sequence is written to the memory location indicated by newest data address F201 at step S303.

Control then proceeds from step S303 to step S304, which checks to see if data has been received from condition-matching interval detection section 26 to indicate a starting point or end point of a statement. If data indicating a starting point or an end point has been received, then control proceeds from step S304 to step S311, and the data from condition-matching interval detection section 26 is checked as to whether it is a starting point or an end point of a statement.

If the data indicates the starting point of a statement, where the audio level has increased beyond a prescribed level, then control proceeds to step S312. A starting point marker is stored in the memory location identified by the newest data address. If the data indicates an end point, control proceeds to step S313, and an end point marker is stored in the memory location identified by the newest data address.

Once the operation at step S312 or step S313 has been completed, control proceeds to step S305 and the newest data address is moved forward according to the amount of data stored.

If user-input data detection section 21 detects handwriting data from a pen at step S301, then the handwriting data from the pen is displayed onto display section 25, and the storing of data into first memory section 22 and second memory section 23 is begun.

Thus, when user-input data detection section 21 detects handwriting data from a pen, the results from the detection are sent to third memory section 24, as shown in FIG. 5. The condition for step S301 is fulfilled, so control proceeds to step S306. From the image data sequence stored in third memory section 24 is taken an image data sequence beginning with the image frame indicated by starting point F204, which precedes newest data address F201 (corresponding to when user-input data was detected), and ending with the image frame indicated by newest data address F201. This image data sequence is sent to compression section 27.

Referring to FIG. 6, the description of this embodiment will consider starting point F204, which is closest to newest data address F201, to be the header address for the compressed image data sequence. However, a starting point further away from newest data address F201 (the n-th closest starting point), such as F202, could be used as the header address for the compressed image data sequence. It would be possible to have the user vary the "n" in the n-th closest starting point to the newest address to be used as the header address for the compressed image data sequence.

When no voices from meeting attendees are detected and handwriting data from a pen is detected at step S301, then the starting point immediately preceding the entry of handwriting data is used as the header address for the compressed image data sequence. However, in such cases it would also be possible to have the user vary the "n" in the n-th closest starting point to the newest address to be used as the header address for the compressed image data sequence.

Compression section 27 receives the detection results of condition-matching interval detection section 26 from third memory section 24, and, based on these results, frame-dropping compression is performed on sections of the image sequence received from third memory section 24. As described before, no compression is performed on the image data within the condition-matching interval from the starting point to the end point of a statement. Frame-dropping compression is performed on image data from other intervals.

Referring to FIG. 7, once compression operations by compression section 27 are completed, a notification that compression has been completed is sent to third memory section 24. At step S307, third memory section 24 detects this notification that compression has been completed and assumes that the operations performed by compression section 27 are done. Control then proceeds to step S308. Third memory section 24 is cleared by giving oldest data address F200 the same value as newest data address F201. Then steps S303 and subsequent steps are performed in the manner described above.

When user-input data detection section 21 does not detect handwriting input data from a pen at step S301, and image data is about to be erased at step S302 from third memory section 24 (when the newest data overwrites the oldest data), a pre-determined, fixed amount of data is sent to compression section 27 at step S309. Once dropped-frame compression is performed by compression section 27, the data is stored in first memory section 22. Then, at step S310, the oldest data address in third memory section 24 is incremented according to the amount of data sent to compression section 27. Then, control proceeds to step S303, and the operations described above are repeated.

Figure 9A:
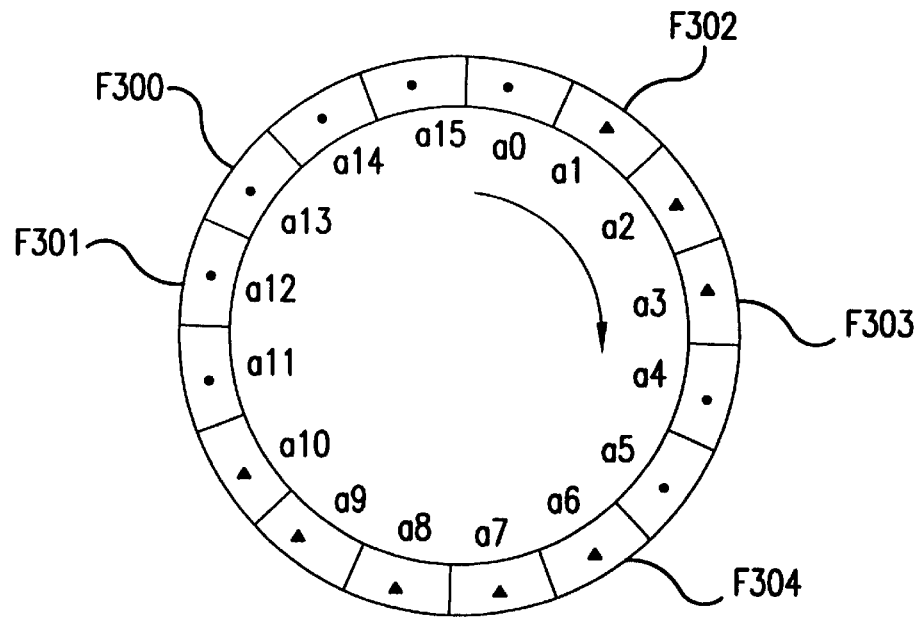
FIG. 9 illustrates the operation of the third memory section of the first embodiment when there is no remaining memory capacity.
Figure 9B:
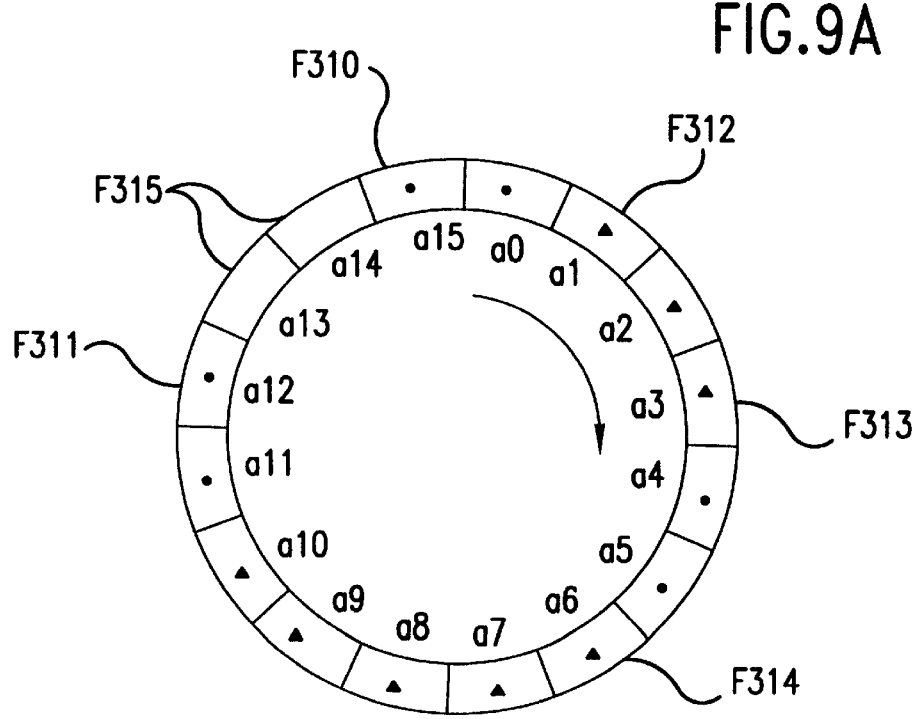

Referring to FIG. 9, the following is a description of the operations performed in step S309 and step S310.

FIG. 9 (A) shows the state immediately before the oldest image stored in address a13 of third memory section 24 is about to be overwritten by the newest image data. Third memory section 24 detects this state at step S302 in FIG. 8, and an image data sequence having a fixed size is sent from oldest data address F300 to compression section 27.

FIG. 9 (B) shows a case where the image data sequence stored in address a13 and address a14 have been sent to compression section 27, and the new oldest data address 310 has been moved forward to a15. This creates empty memory spaces at address a13 and address a14.

When an image data sequence to be erased from third memory section 24 is sent to compression section 27, the image data sequence is sent to compression section 27 as an interval where no statements are present regardless of whether the output image data sequence contains starting points or end points of a statement. Thus, frame-dropping compression is performed on the image data sequence data that had been stored at address a13 and address a14, and the results are recorded in first memory section 22.

It would be possible to allow the user to change the amount of data to be sent to compression section 27 when data is about to be erased from third memory section 24.

Figure 10:
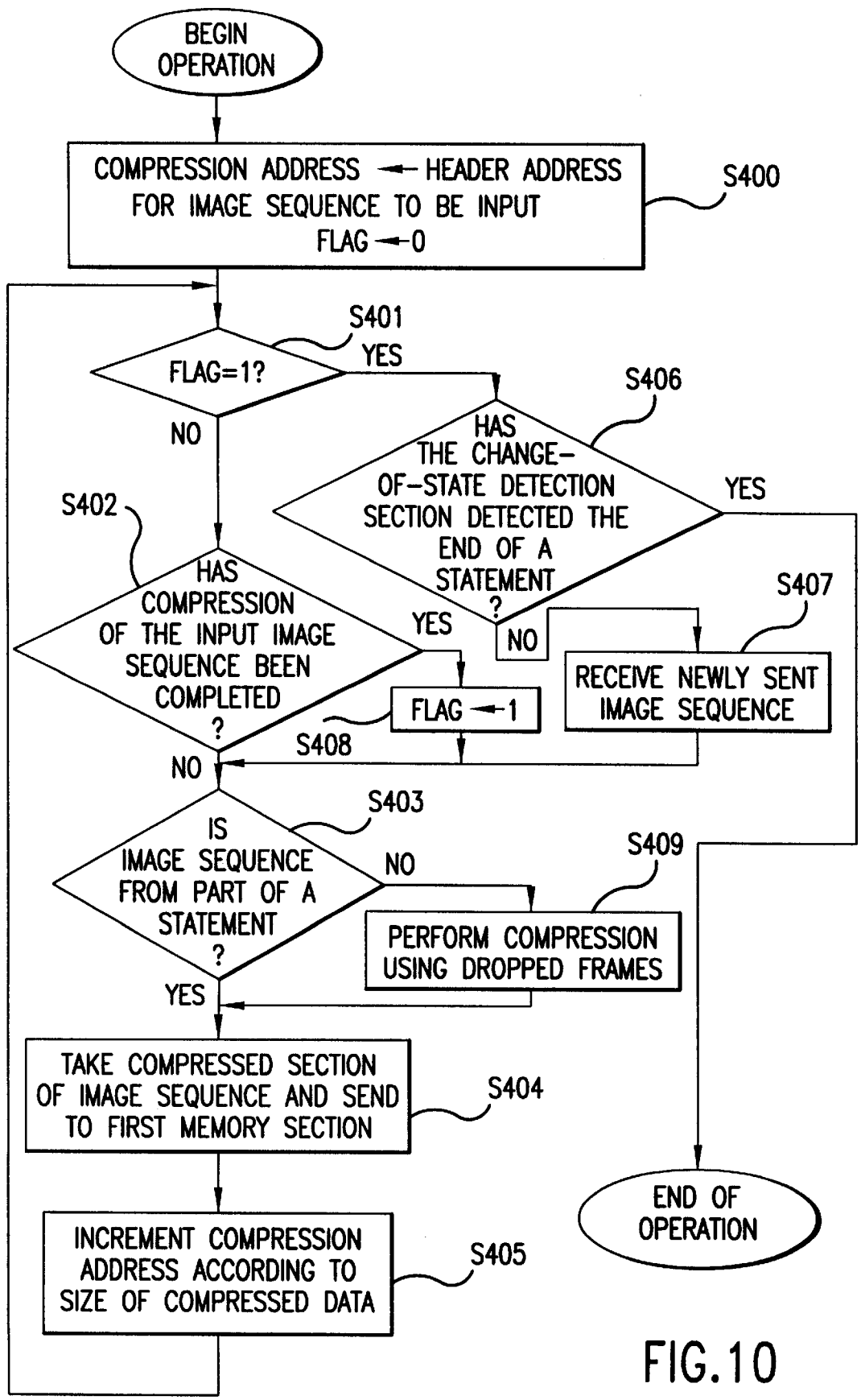
FIG. 10 is a flowchart of the operation performed by the compression section of the first embodiment.

The following is a description of the operations of compression section 27. FIG. 10 is a flowchart describing operations of compression section 27.

First, initialization is performed at step S400. The compression address is set to the header address for the incoming image data sequence, and the flag indicating that compression has been completed is reset to "0". At step S401, the flag is checked to see whether it is set to "1" or not. If the flag is not "1", then control proceeds to step S402, and it is determined whether the compression of the incoming image data sequence has been completed or not.

If the evaluation at step S402 shows that compression has not been completed, then control proceeds directly to step S403. If compression has been completed, then the flag is set to "1" at step S408, and control proceeds to step S403.

When the flag is determined to be "1" at step S401, control proceeds to step S406. Step S406 checks to see whether or not condition-matching interval detection section 26 has detected an end of a statement. If the end of a statement is detected, the flowchart is exited. Referring to FIG. 7, if an end of a statement is not detected, the new image data sequence received from the video input terminal is sent directly to compression section 27 without going through temporary storage in third memory section 24. Control then proceeds to step S403.

Step S403 evaluates whether the image data sequence to be compressed is an image data sequence within a statement interval between a starting point and an end point of a statement. If the image data sequence is within a statement interval, control proceeds to step S404. If the image data sequence is not within a statement interval, then control proceeds from step S403 to step S409, and the data is compressed using frame-dropping, as described above, after which control proceeds to step S404.

At step S404, the portion of the image data sequence that has been compressed is sent to first memory section 22. Control then proceeds to step S405, and the compression address is moved forward according to the amount of data that was compressed. After step S405, control returns to step S401, and the processing steps described above are repeated.

The following is an organized summary of the operations performed by compression section 27 described above. Starting at the header address, the image data sequence sent to compression section 27 is evaluated in sequence to see whether the image signal falls within a statement interval. The data is compressed through frame-dropping and stored in first memory section 22. For example, an image data sequence may comprise 100 frames of images, and 10 sequential frames may serve as one section of the image data sequence. In this case, each section of the image data sequence would be evaluated to see whether it is an image data sequence that is part of a statement.

The sections of the image data sequence that are determined not to be within a statement interval are compressed using frame-dropping, where only the first frame of the 10 frames is saved and the other 9 frames are discarded (step S409). If, on the other hand, the section of the image data sequence is determined to be within a statement interval, then no frame-dropping compression is performed on the section of the image data sequence, and the data is stored directly in first memory section 22.

The number of image frames contained in a single section of an image data sequence does not need to be fixed. The number can be varied according to the size of the image data sequence received and can also be changed by the user.

The operations described above are repeated for the entire image data sequence received. When the processing of the entire image data sequence has been completed, control proceeds to step S408, and the flag is set. By setting this flag, a notification that compression has been completed is sent to third memory section 24.

From the operations described above, the image data sequence stored in first memory section 22 would begin with the start of a statement by a speaker and end with the entry of data from the pen. However, at step S406 and step S407, the storage into first memory section 22 of the image signal captured from the camera is continued until the end of the statement from the speaker is detected.

If an excessive amount of processing time takes place during the compression of the entire incoming image data sequence (the operations from S400 to S408), then during this processing a separate buffer memory (not shown in the drawings) is used for temporary storage of image signals captured from the camera and detection results from detection section 1. Or, it would also be possible to use a section of the third memory section or the first memory section for this buffer memory.

Figure 11:
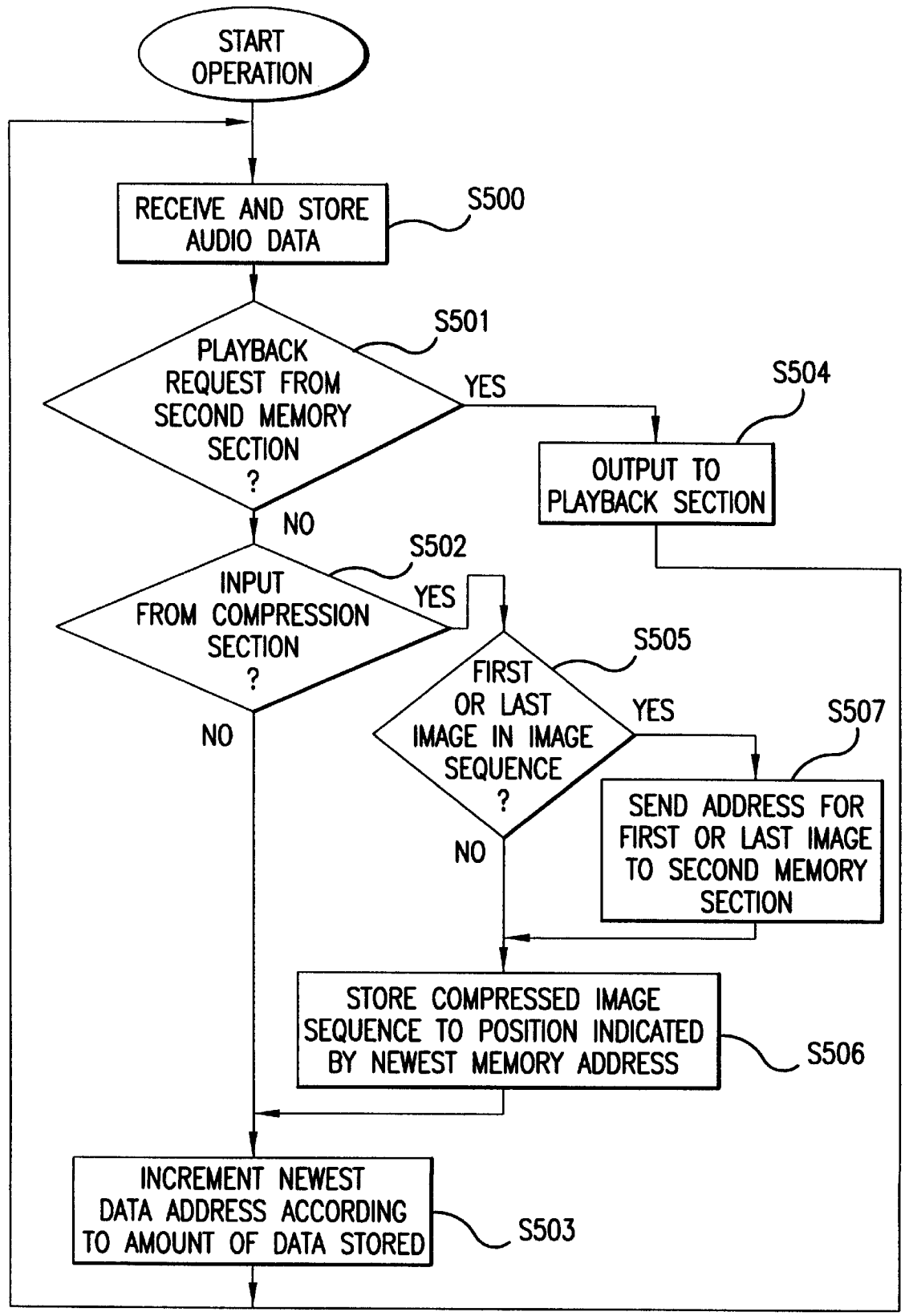
FIG. 11 is a flowchart of the operation performed by the first memory section of the first embodiment.

The following is a description of the operation of first memory section 22. FIG. 11 is a flowchart describing the operations of first memory section 22.

First memory section 22 sequentially stores image data sequences and audio data from compression section 27. However, as described above, this embodiment stores audio data without using compression. Thus, the incoming audio data is stored directly into first memory section 22 without going through third memory section 24 (step S500).

If there is no playback request from second memory section 23 (step S501), the image data sequence sent from compression section 27 is detected at step S502. Control then proceeds to step S505, and the image data is evaluated to see whether it is at the beginning or the end of an image data sequence (the beginning or the end of an image data sequence corresponding to the detection of user-input data at the time). If the data is not at the beginning or the end, it is stored in sequence at step S506. If the data is at the beginning or the end, then its starting or ending address is sent to second memory section 23 at step S507. Then, control proceeds to step S506, and the starting or ending image data is saved to first memory section 22.

Step S505 and step S507 perform operations to send to second memory section 23 the starting address and the ending address of a statement by a speaker corresponding to the user-input data detection at the time.

The following data is stored to second memory section 23: the handwriting data entered by the user with the pen; data specifying the display position of this input data from the pen (e.g. absolute coordinates or relative coordinates on the X-Y coordinate axes); and the memory address of first memory section 22 at which was stored the audio or image signals received when the handwriting data from the pen was received.

In this embodiment, the memory address of the audio data or image data received when pen data was entered is not saved to second memory section 23. Instead, the starting address and the ending address of a statement from a speaker, determined based on the detection results from condition-matching interval detection section 26, is saved to second memory section 23.

Figure 12:
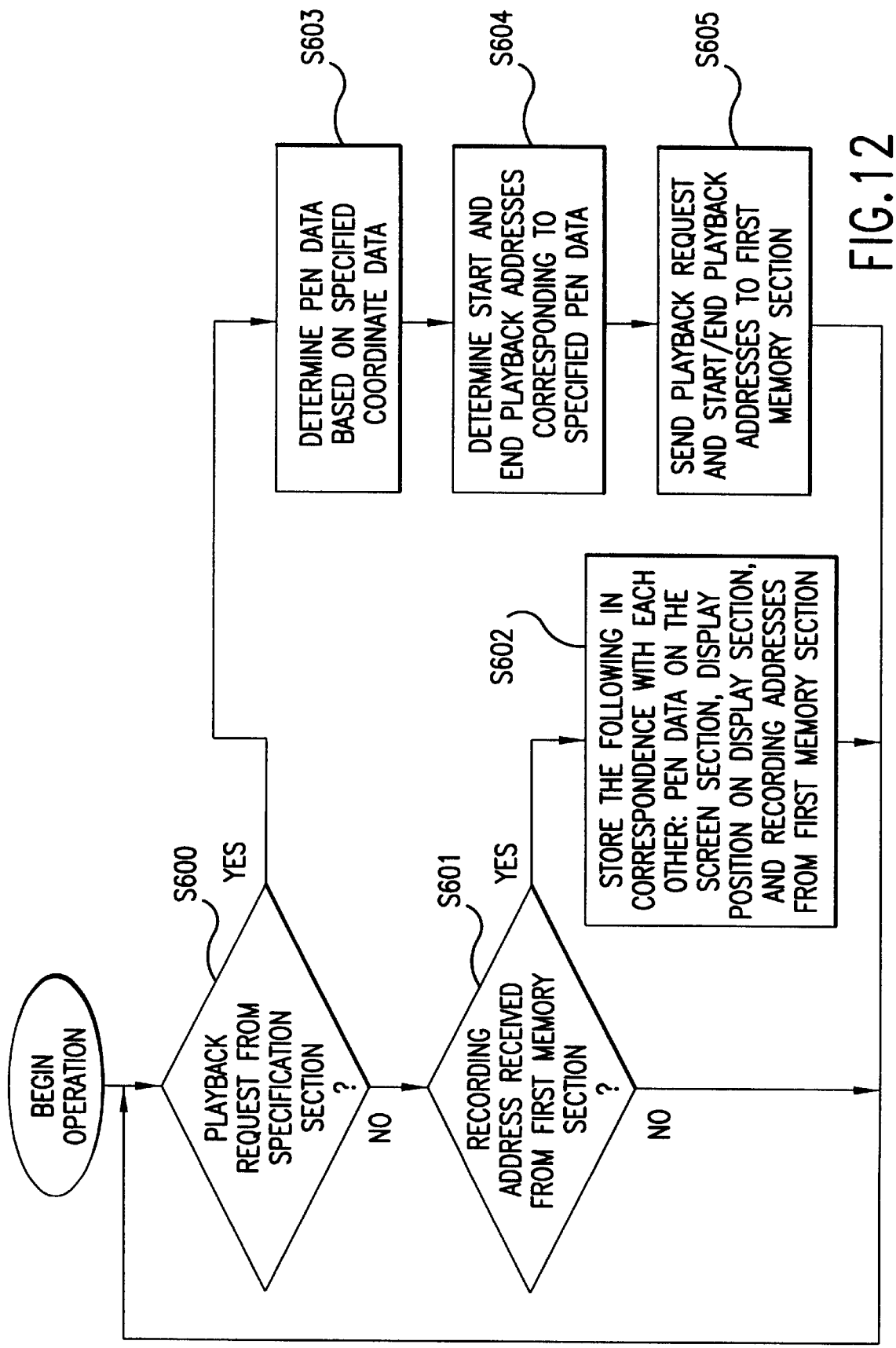
FIG. 12 is a flowchart of the operation performed by the second memory section of the first embodiment.

FIG. 12 is a flowchart describing the operations of second memory section 23.

Referring to FIG. 11, in step S505 and step S507, the address of the starting point and ending point of a statement from a speaker is sent to second memory section 23. Referring to FIG. 12, this data is detected as input by second memory section 23 at step S601. Then, control proceeds to step S602. The handwriting data from the pen on display section 25, the display position on display section 25, and the addresses in first memory section 22 of the starting point and end point of the statement from the speaker are saved to second memory section 23.

Figure 13:
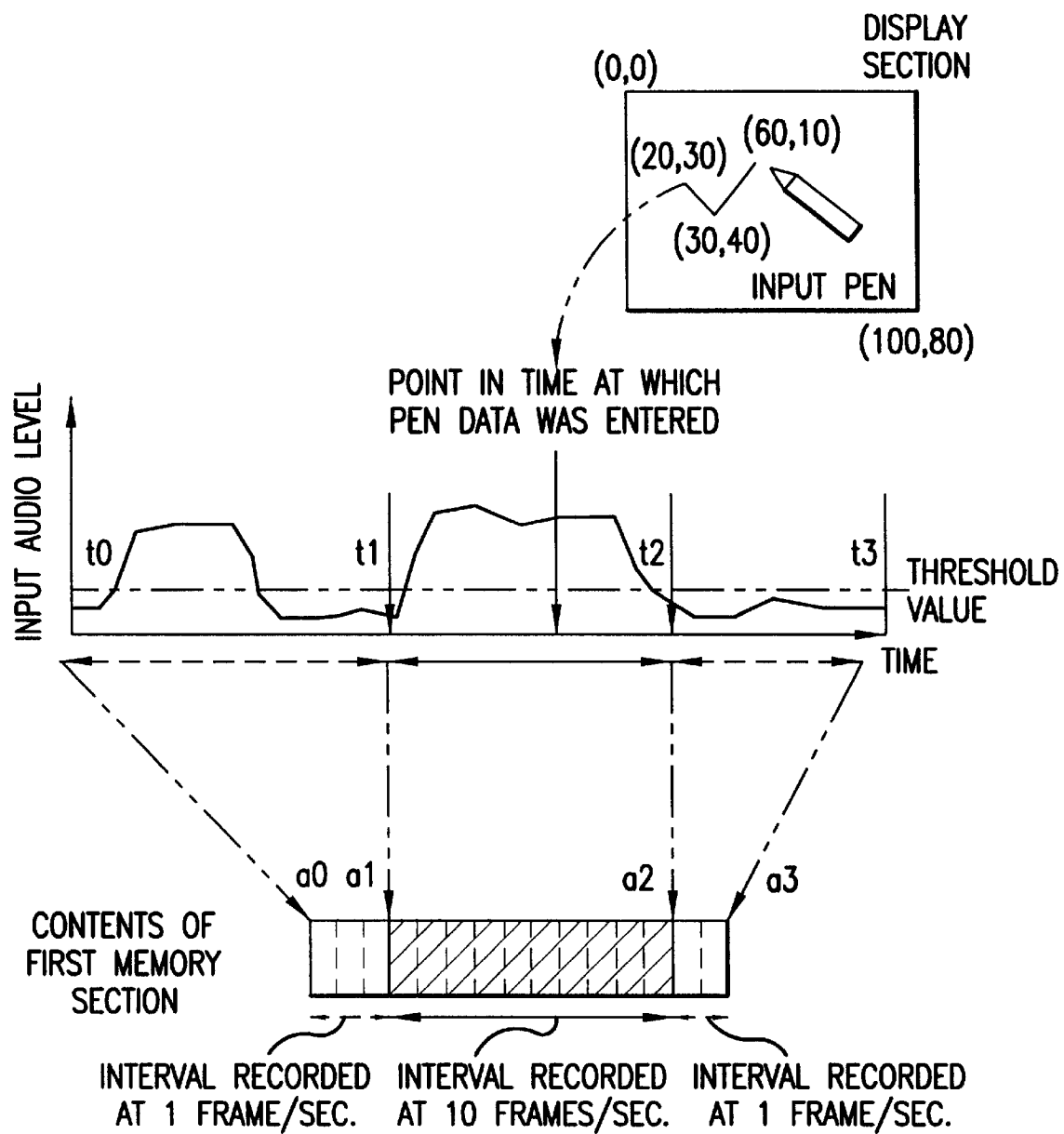
FIG. 13 illustrates the relationship between the display section, the condition-matching interval detection section, and the first memory section in the first embodiment.
Figure 15:
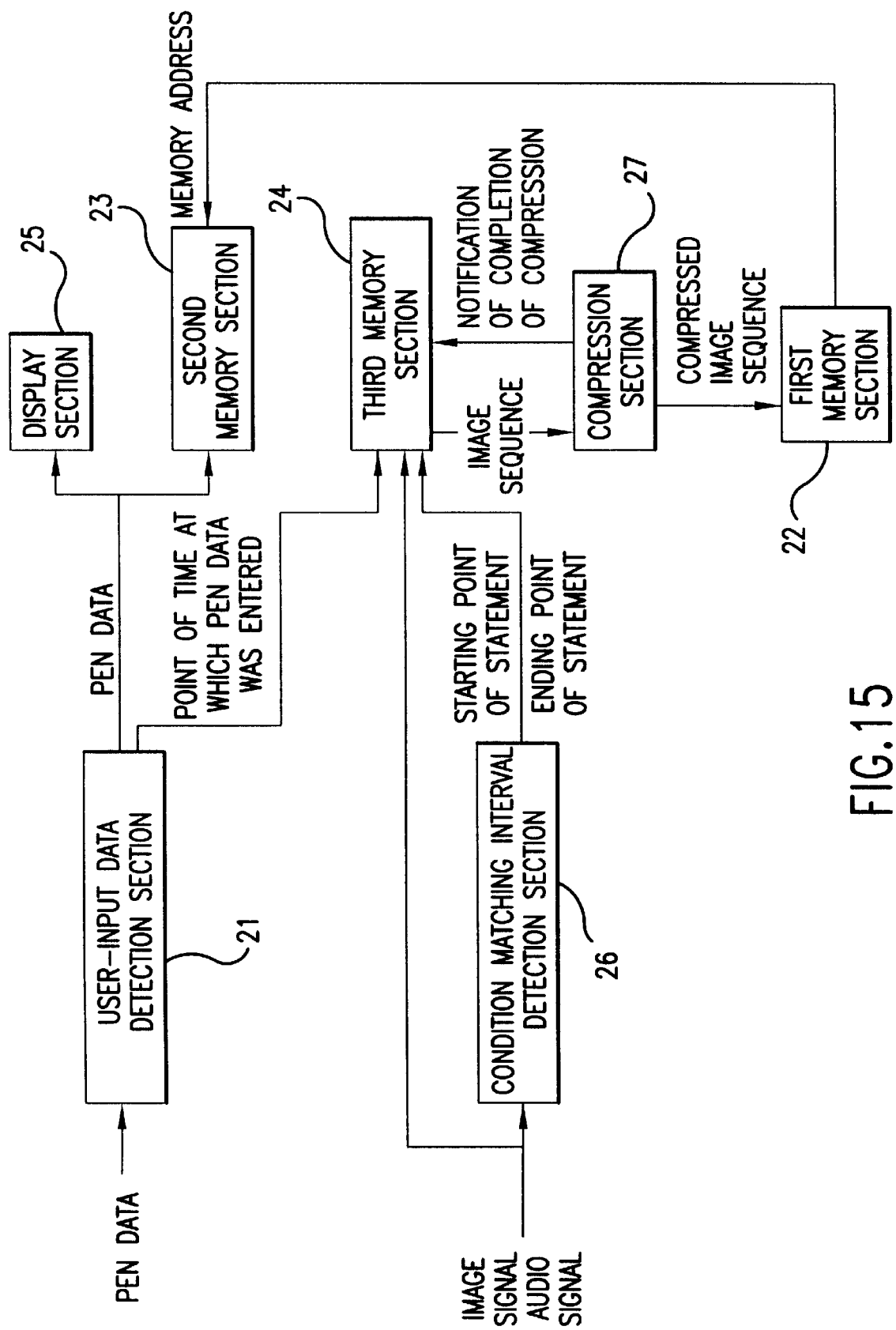
FIG. 15 illustrates a summary of the recording operation performed by the second embodiment.

FIG. 13 and FIG. 15 are drawings describing the operations performed by the present device. The drawings show the relationships between the handwriting on display section 25, the input audio levels, the data structure used in first memory section 22, and the data structure used in second memory section 23.

Referring to FIG. 13, in this example the input audio levels were such that the results of detection by condition-matching interval detection section 26 set a time t1 as a starting point of a statement, and a time t2 as an ending point of a statement. Also, in this example, pen input by the user was detected in the interval between time t1 and time t2. In this case, the image data from an interval t1–t2 is stored in first memory section 22 at addresses a1–a2. The image data is stored directly, and no frame-dropping compression is performed.

On the other hand, in the data saved in first memory section 22, frame-dropping compression is performed for the image data stored between address a0 and address a1, which precede time t1, as well as the image data stored between address a2 and address a3, which come after time t2.

Figure 14:
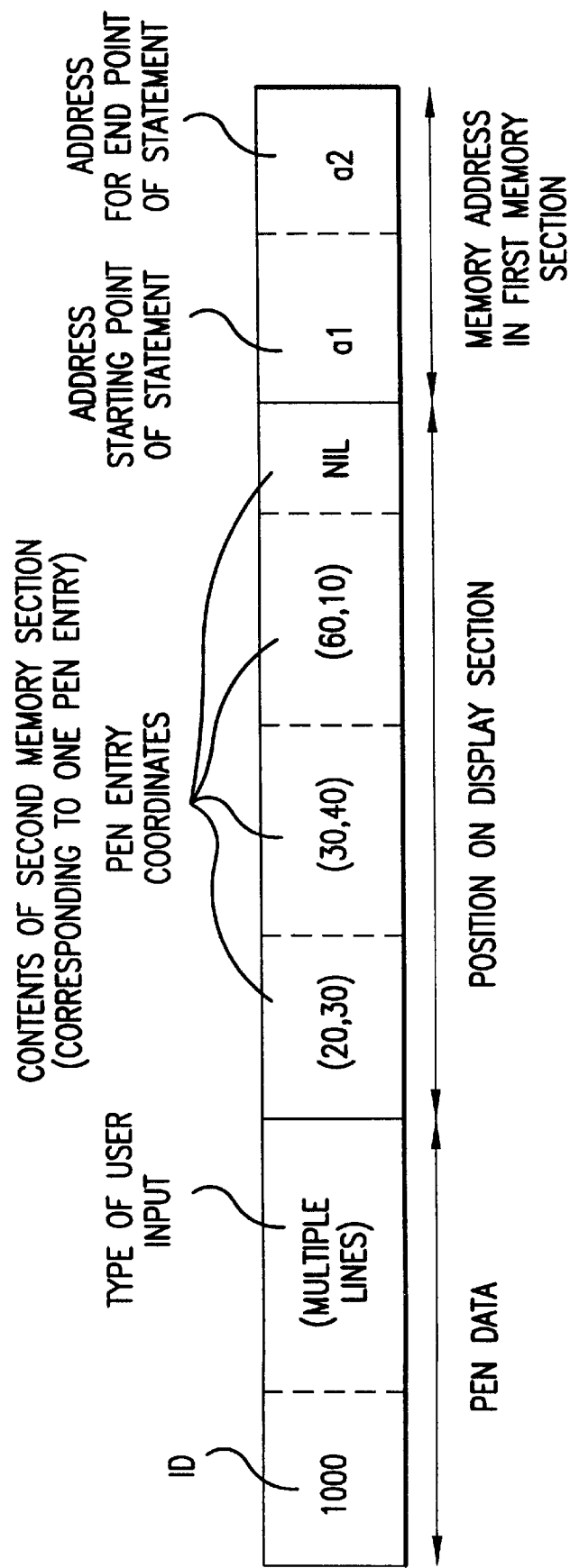
FIG. 14 illustrates the memory capacity of the second memory section of the first embodiment.

In FIG. 14, the data saved in second memory section 23 would appear as shown in the drawing. The data structure comprises handwriting data from the pen, the display position data on display section 25, and memory addresses in first memory section 22.

Data saved for the user's pen input comprises an ID uniquely identifying the user-input data, as well as data specifying the type of user-input data. For the display position data on display screen 3, three sets of X-Y coordinates and a nil indicating the end of coordinate information are saved. In this example, a coordinate (20, 30), a coordinate (30, 40), and a coordinate (60, 10) are used. For the memory addresses from first memory section 22, starting point address a1 and ending point address a2 for the statement from a speaker are saved.

Of course, the data stored in second memory section 23 does not have to be the pen input data, display coordinates, and memory addresses themselves, and can instead be identifiers that refer to this data. The data structure used in second memory section 23 also does not have to take the form of a table, and can instead be structured as a list.

In this embodiment, the pen-input data also contains data specifying the type of user-input data. A sequence of coordinate points representing multiple lines or the like is saved as a single unit of pen-input data. Thus, during playback, one of these coordinate point sequences can be specified in order to indicate the pen-input data corresponding to that sequence of coordinate points. Then, the image or audio data from that memory address can be played back.

Furthermore, a plurality of coordinate point sequences entered consecutively within a prescribed time interval can be stored as a single unit of pen-input data. This allows a line of characters to be considered as a unit of pen-input data. Any of the coordinate point sequences making up the line of characters can then be specified to playback the audio or image data from that memory address. This makes operations more convenient.

The following is a description of the operations that take place during playback.

The user uses the pen to specify (point at) one out of a plurality of pen-input data displayed on display section 25. From the audio or image signals stored in first memory section 22, only the section that was received immediately before and after the pen-input data was received is played back.

Also, from the image signals entered immediately before and after the pen-input data was entered, playback can be performed beginning with the section of the image signal when a speaker starts a statement. In the case of this embodiment, the input pen also serves as playback specifying section 28, which is used for specifying playback.

Playback specification section 28 can also comprise a mouse, a track ball, cursor keys, or the like. Also, the method for specifying pen-input data can involve pointing, surrounding (surrounding using a closed curve or an oval), entering an ID, drawing a line under a displayed item, or the like.

If specification is performed by surrounding or underlining, and a plurality of pen-input data is selected, one of the specified items can be selected based on some sort of prioritizing (e.g. automatic selection of the pen-input data that was entered earliest or the pen-input data that is displayed furthest to the left). It would also be possible to display the candidate selections as a list and have the user select from the list. Furthermore, as described in Japanese laid-open publication number 6-276478 and Japanese laid-open publication number 6-205151, it would also be possible to have static images displayed in a specific sequence (for example, according to time), and to have one image selected out of these index images.

The display positions on display section 25 are specified using X-Y coordinates. Thus, when a display position is specified using playback specifying section 5 (e.g. a pen), the X-Y coordinates corresponding to the display position is determined.

When a playback request is received from playback specifying section 28 as described above, the request is detected at step S600 from the flowchart in FIG. 12, which illustrates the operations performed with second memory section 23. Control then proceeds to step S603, where the selected coordinates obtained from playback specifying section 28 are compared with the X-Y coordinates groups calculated from the X-Y coordinates (all the point coordinate group making up the multiple lines defined by the endpoints in FIG. 14 entered with the pen) stored in second memory section 23. Based on this comparison, the corresponding pen-input data is selected.

Next, at step S604, the starting address and the ending address for the audio data or image data corresponding to the pen-input data is retrieved from second memory section 23. Control then proceeds to step S605, and the addresses and a playback request is sent to first memory section 22.

First memory section 22 receives the playback starting/ending addresses and the playback request. Referring to the flowchart in FIG. 11, the inputs are detected at step S501. Control proceeds to step S504, and output is sent to the playback section.

When coordinate comparisons are being performed at step S603, it is possible to have slightly offset coordinates register as a match. This way, even if coordinate points that are slightly off are entered during selection, the desired memory address can be retrieved.

Also, even if the user-input data is a type of data that is not displayed, a prescribed symbol indicating the presence of the user-input data is displayed on display section 25.

Thus, the desired memory address can be retrieved in the same way as described above. Furthermore, as described in the section on recording operations above, a coordinate point sequence can be linked to a single piece of pen-input data and saved to second memory section 23. In such cases, the desired memory address can be retrieved if any of the coordinates in the coordinate sequence registers a match.

Using the playback starting address (address a1 in FIG. 13) and the playback stopping address (address a2 in FIG. 13), as determined from the operations described above, playback section 29 begins playing back the audio data or the image data in first memory section 22.

During playback, it is common for the user to change the playback speed or rewind the footage a little and playback slowly. Therefore, playback section 29 may be equipped with a fast-forward function, a rewind function, a slow-playback function, and a pause function. A slide bar indicating the time axis may be used, and the point in time that is currently being played back may be indicated by a pointer on the slider, with the user being able to specify playback positions by sliding the pointer in the bar.

Playback speed does not have to be implemented to coincide with the timing used in recording. It would be possible to maintain the sequential relationships within the footage while playing back the data at a faster speed. It would also be possible to playback, with dropped frames, only the intervals in which a speaker is making a statement.

For example, it would be possible to playback at double speed the interval between time t0 to time t1 and the interval between time t2 and time t3 as shown in FIG. 13. The interval between time t1 and time t2 would be played back at the recorded speed, i.e. normal playback would be performed.

Furthermore, it would also be possible, after a pause in playback, to have playback specifying section 28 indicate that playback should be resumed. New user-input data can be added as well.

In the embodiment described above, the audio signals are not compressed. However, it is also possible to compress the audio signals for storage, just as in the video signals. In such cases, audio signals and image signals from a microphone and a video camera would be sent to the data storage/playback device of this embodiment. These signals would both be processed by condition-matching interval detection section 26 and then sent to third memory section 24 for temporary storage.

Then, when user-input data detection section 21 detects the entry of pen-input data, the detection results from condition-matching interval detection section 26, which had been stored temporarily in third memory section 24, are used by compression section 27 to compress sections of the audio and image data stored temporarily in third memory section 24. The compressed audio and image data is sent to first memory section 22.

If audio and image data is about to be erased from third memory section without there having been detection of pen-input data by user-input data detection section 21, then, as in the embodiment described above, the audio and image data is compressed at a high compression ratio and sent to first memory section 22. The compression method used for the audio data can involve known methods such as varying the recording time, sampling frequency, or number of encoded bits.

In the description of the above example, there is initially no displayed data on display section 25. However, the present invention is not restricted to this example, and there can, for example, be a number of pieces of user-input data already displayed in the initial state, with the user being able to make additions and changes. However, in such cases, the user-input data that can be specified for playback is restricted to the sections that had been changed from the initial state.

A data storage/playback device as described in this example can be used so that when the recorded audio or image signals are being played back, the user-input data is also reproduced in sequence on the screen. The display on display 25 returns to the state of the display when the pen-input data specified by playback specifying section 28 was entered. The audio or image data is then reproduced with the pen-input data in synchronization.

The display screen can be returned to the display from that point in time by repeatedly performing UNDO operations on the display screen until that point in time is reached. It would also be possible to clear the screen and then sequentially display the pieces of user-input data at a high-speed until that point in time is reached.

In the embodiment described above, user-input data detection section 21 detects when the user has written something with the pen. It would also be possible to detect when pen input has been interrupted for a fixed interval or longer, and then link the time when detection occurred with the audio data and image data.

Compression section 27 is not restricted to the example described above. Compression section 27 can be a device that dynamically changes at least one of the following during compression of the image signal: recording time; compression ratio of intra-frame compression; compression ratio of inter-frame compression; intervals in recording interruptions; ratio used for dropping color data; and ratio used for dropping brightness data. Or, the device can dynamically change at least one of the following during compression of the audio signal: recording time; sampling frequency; and number of encoding bits.

Compression of moving images can be performed by using intra-frame compression and inter-frame compression. Intra-frame compression can be performed by using vector quantization and discrete cosine transformations. Inter-frame compression can be performed by recording only the differences in the image data between sequential frames. Any device that converts data per time unit into a smaller amount of data can correspond to compression section 27 in the present invention.

The events that can be detected by condition-matching interval detection section 26 are not restricted to the start and the end of statements from a speaker. Other events that can be detected include: a change in the speaker; the appearance in the audio signal of key words entered beforehand; the appearance in the audio signal of audio patterns entered beforehand; the appearance in the image signal of a sequence of characters entered beforehand; a change in the state of the image signal; a change in state detected by an external sensor; a change in camera work; or the like. In other words, condition-matching interval detection section 26 used in this invention can be any device that detects changes in the time-series data input (e.g. audio or image signals), or that detects a change in a signal from an external sensor while time-series data input is present. If a transition point is used as a detection condition, then the end point can be a point that is a pre-determined, fixed interval from the transition point.

The sequentially recorded time-series data can be an analog signal sent from a camera, a microphone, a video deck, a tape recorder, a sensor, or the like, or the data can be a digital signal encoded from such an analog signal. Furthermore, the data can be a digital signal received through a computer network/computer bus. In other words, the time-series data referred to in the present invention can be any data that is sequentially received over time.

In the first embodiment described above, compression section 27 receives data from the image data sequence stored in third memory section 24 in the form of an image data sequence starting with the moment a statement from a speaker begins and ending with the point in time when pen-input data is entered. However, if enough memory capacity is available in third memory section 24, the image data sequence to be sent from third memory section 24 to compression section 27 can comprise the interval starting with the beginning of a statement from a speaker and ending with the end of the statement.

Referring to FIG. 15, according to this configuration, there is no need to send the output from condition-matching interval detection section 26 to compression section 27. Thus, the structures of condition-matching interval detection section 26 and compression section 27 can be significantly simplified.

FIG. 16–FIG. 19 are flowcharts describing the operations of third memory section 24 when the output from third memory section 24 to compression section 27 comprises a image data sequence starting with the beginning of a statement and ending with the end of the statement. In this flowchart, when the flag is set to "1", this indicates that user input has been detected. When the flag is set to "0", then user input has not been detected.

At step S800, the flag is set to "0". Next, at step S801, a single time unit's worth of images are received. At step S802, user-input data detection section 21 is checked to see whether any detection output is present.

If user-input data was detected, the flag is set to "1" at step S807, and control proceeds to step S803. If no user-input data was detected, the flag is left as "0" and control proceeds to step S803. Then, step S803 checks to see if the newest data will overwrite the oldest data in the ring buffer. If overwriting is to take place, then at step S803 the received image data sequence is saved to third memory section 24 at the address indicated by the newest data address.

Control then proceeds from step S804 to step S805. Step S805 checks to see if data indicating a starting point or end point of a statement was received from condition-matching interval detection section 26. If data indicating a starting point or end point was received, then control proceeds from step S805 to step S810, and the nature of the data from condition-matching interval detection section 26 is determined (whether it is a starting point or an end point of a statement).

If it is a starting point of a statement, where the audio level changes to a level at or above a prescribed level, then control proceeds to step S811. A statement starting point marker is recorded at the memory position indicated by the newest data address. Then, at step S806, the newest data address is incremented according to the size of the data that was stored.

If, at step S810, there was an end point of a statement, where the audio level changes to a level at or below a prescribed level, then control proceeds to step S812. A statement end point marker is stored in the memory position indicated by the newest data address. After step S812, control proceeds to step S813, where the flag is checked to see if it is set to "1" or not. If the flag is not set to "1", control proceeds to step S806, and the newest data address is incremented according to the size of the data that was stored. Then, control proceeds from step S806 to step S801.

If, at step S813, the flag was found to be set to "1", then control proceeds to step S814. From the image data sequence stored in third memory section 24 is taken the image data sequence beginning with the statement starting point preceding the detection of user-input data and ending with the statement end point. This image data sequence is sent to compression section 27.

Referring to FIG. 15, when compression has been completed, compression section 27 sends a notification that compression has been completed to third memory section 24. At step S815, this notification is detected, and it is determined that the operation performed by compression section 27 has been completed.

Control then proceeds to step S816. Third memory section is cleared by setting the oldest data address to the same address as the newest data address. Then, control proceeds to step S817, and the flag is restored to "0". Control then returns to step S801.

If no pen-input data was not detected by user-input detection section 21 at step S802, and data is about to be erased from third memory section at step S803 (the newest data is about to overwrite the oldest data), then a predetermined, fixed amount of image data is sent to compression section 27 at step S808. Compression section 27 performs compression through the dropping of frames, and the results are stored in first memory section 22. Then, at step S809, third memory section 24 increments the oldest data address according to the size of the data transferred to compression section 27. Then, control proceeds to step S804, and the operations described above are repeated.

Figure 16:
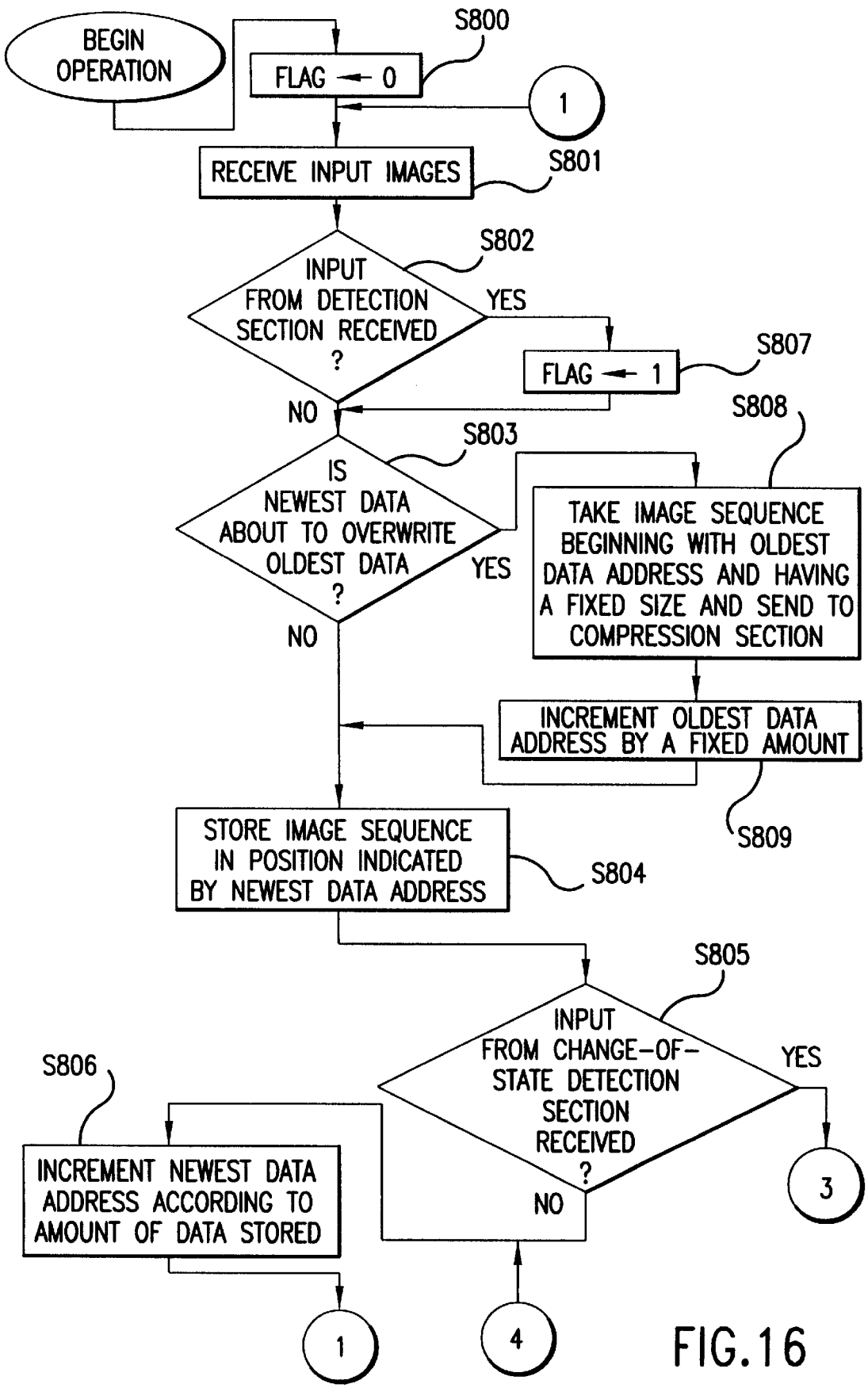
FIG. 16 is a section of a flowchart of the operation of the third memory section of the second embodiment.
Figure 17:
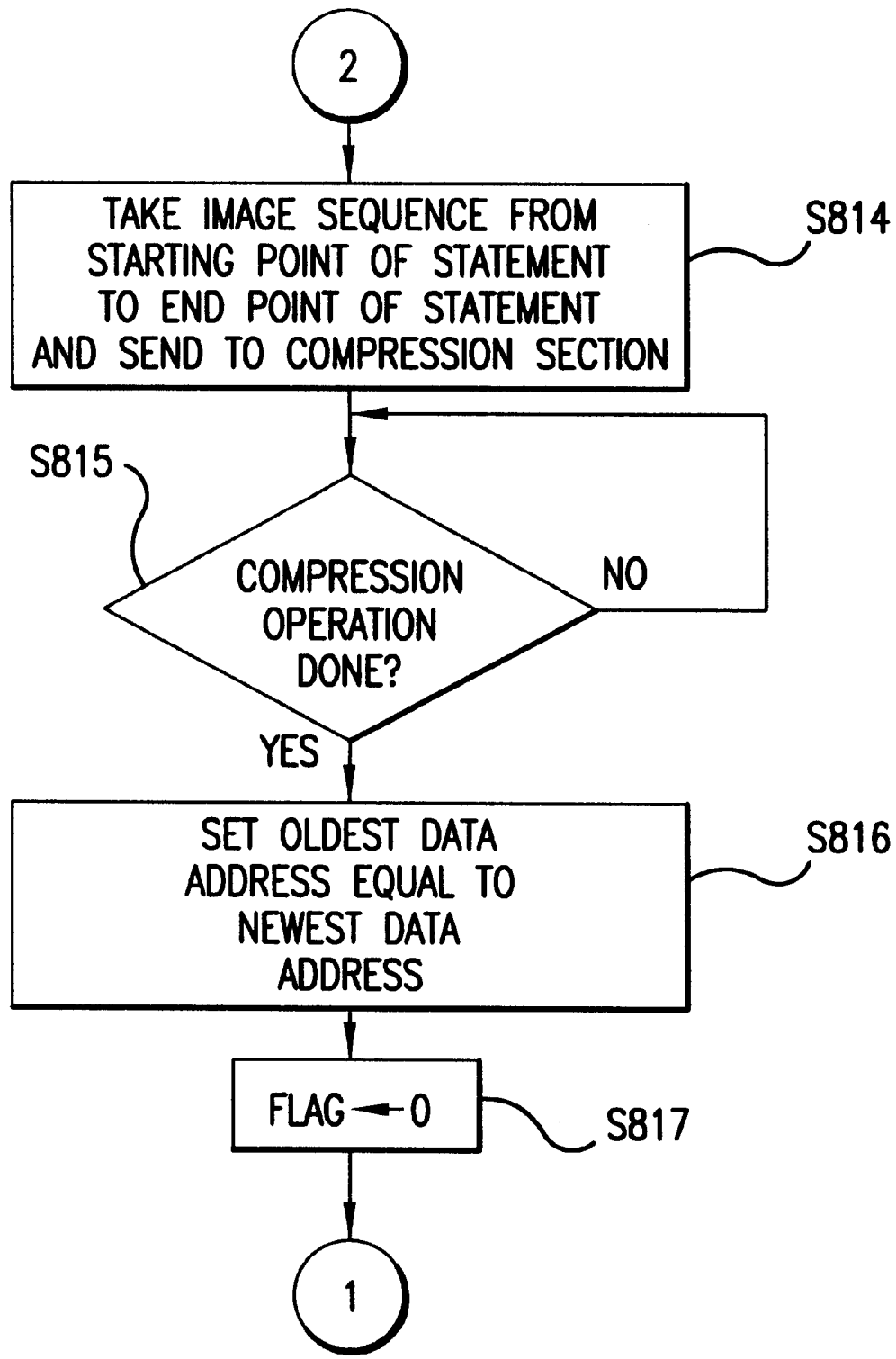
FIG. 17 is a section of a flowchart of the operation of the third memory section of the second embodiment.
Figure 18:
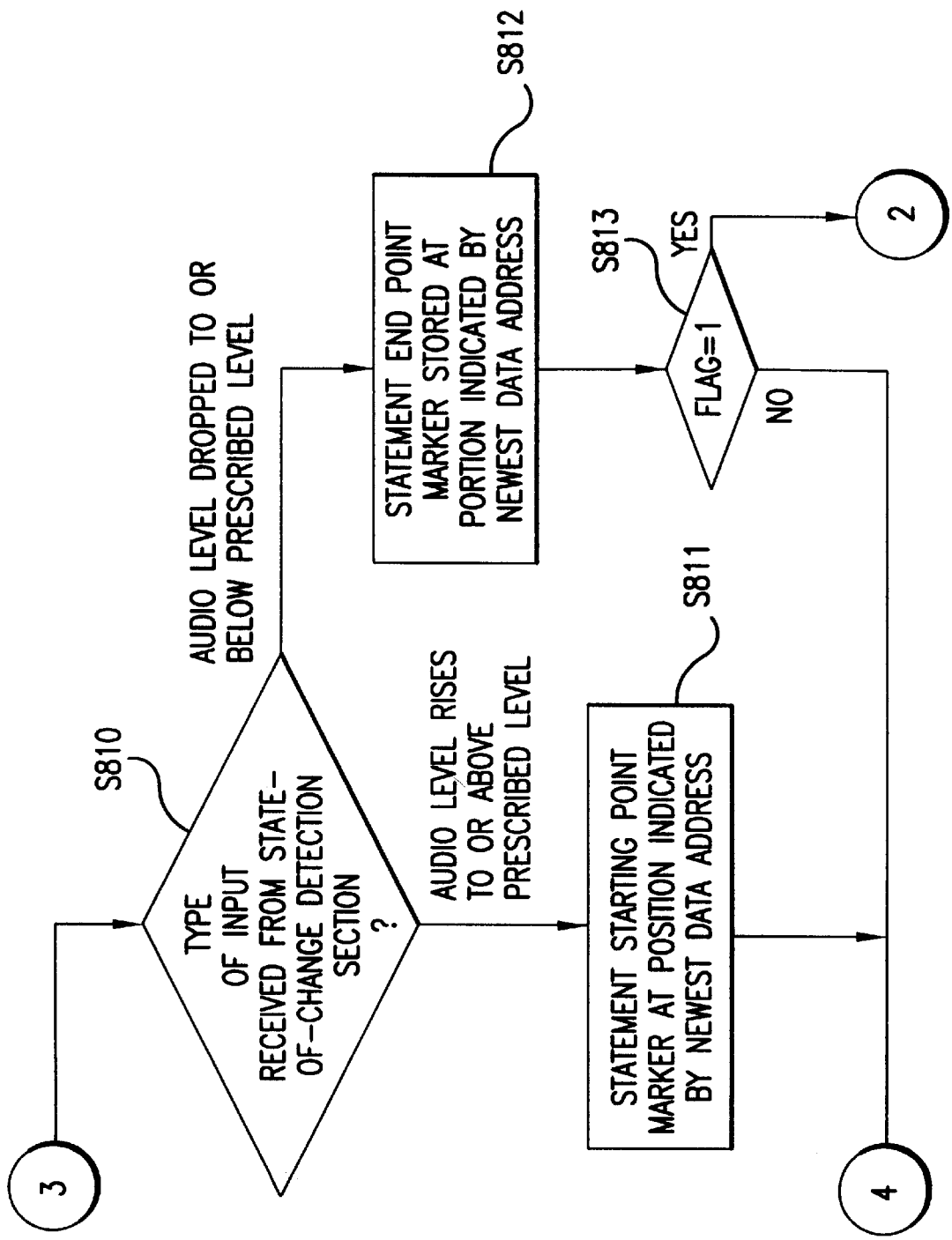
FIG. 18 is a section of a flowchart of the operation of the third memory section of the second embodiment.

As the above description shows, if the entry of pen-input data is detected by user-input data detection section 21, then the flag is set to "1" at step S807 in FIG. 16. However, at this point, the sending of data to compression section 27 is not begun. The sending of data to compression section 27 is begun when condition-matching interval detection section 26 detects the end of a statement, i.e. when, at step S810, it is determined that the audio level has changed to a level at or below a prescribed level.

Figure 19:
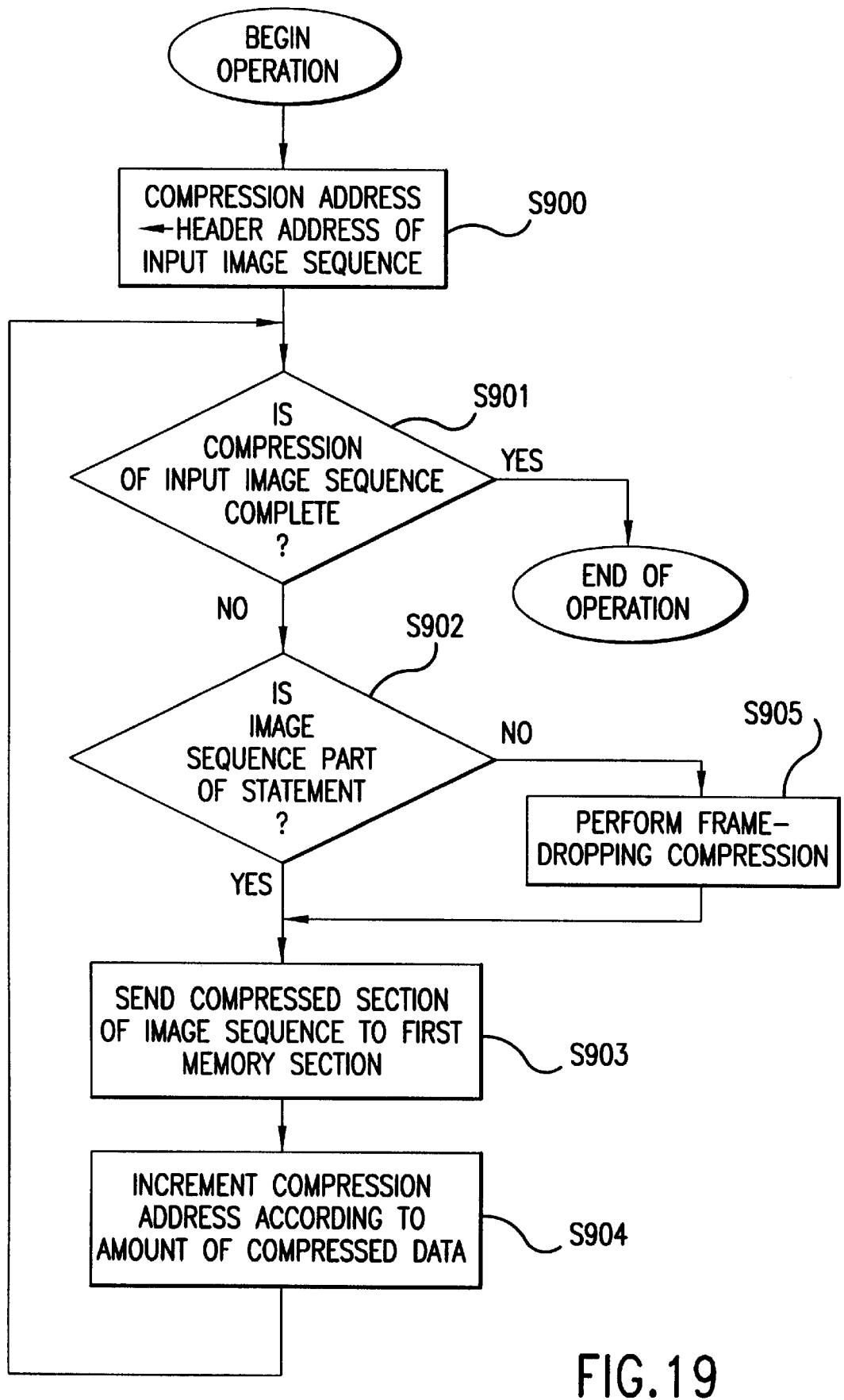
FIG. 19 is a flowchart of the operation of the compression section of the second embodiment.

FIG. 19 is a flowchart describing the operation of compression section 27 in the second embodiment. This flowchart is simpler than the flowchart shown in FIG. 10, which shows the operations of compression section 27 in the first embodiment.

Initialization is performed at step S900, and the compression address is set to the header address of the incoming image data sequence. Then, step S901 checks to see if compression of the incoming image data sequence has been completed or not.

If step S901 determines that compression has not been completed, then control proceeds to step S902. If compression has been completed, then this compression operation is exited.

Step S902 determines whether the incoming image data sequence is an image data sequence is within a statement interval between a statement starting point and a statement end point. If the image data sequence is within a statement interval, control proceeds to step S903. If the image data sequence is not within a statement interval, then control proceeds from step S902 to step S905. The compression operation through the dropping of frames described above is performed, and then control proceeds to step S903.

At step S903, the section of the image data sequence that was compressed is sent to first memory section 22. Control then proceeds to step S904, and the compression address is incremented according to the size of the data that was compressed. After step S904, control returns to step S901, and the operations described above are repeated.

As in the first embodiment, the structure of the second embodiment can be such that the header address for the image data sequence to be compressed is set to the statement starting point that is closest to the newest data address in third memory section 24. It would also be possible to have the header address for the image data sequence to be compressed set to the n-th statement starting point away from (preceding) the newest address, where n is a prescribed number.

In this example, the statement end point immediately following the detection of pen-data input is set to be the end address for the compressed image data sequence. However, it would also be possible to have the n-th statement ending point away (after) be the end address for the compressed image data sequence, with the user being able to choose the value of n.

In the third embodiment, data is continuously saved to third memory section 24, while the incoming image signal is compressed based on the detection results from condition-matching interval detection section 26.

In the first embodiment and the second embodiment described above, the incoming image signal is continuously saved to third memory section 24 without being compressed. However, there may be cases when batch compression of the data from third memory section 24 may take compression section 27 a long time. In such cases, it would be necessary to prepare a large amount of buffer memory to be used as temporary storage for image signals captured by the camera during compression, as well as detection results obtained from user-input data detection section 21.

According to the structure of the third embodiment, compression section 27 does not have to perform compression of a large data sequence all at once. This eliminates the need for the buffer memory described above.

Figure 20:
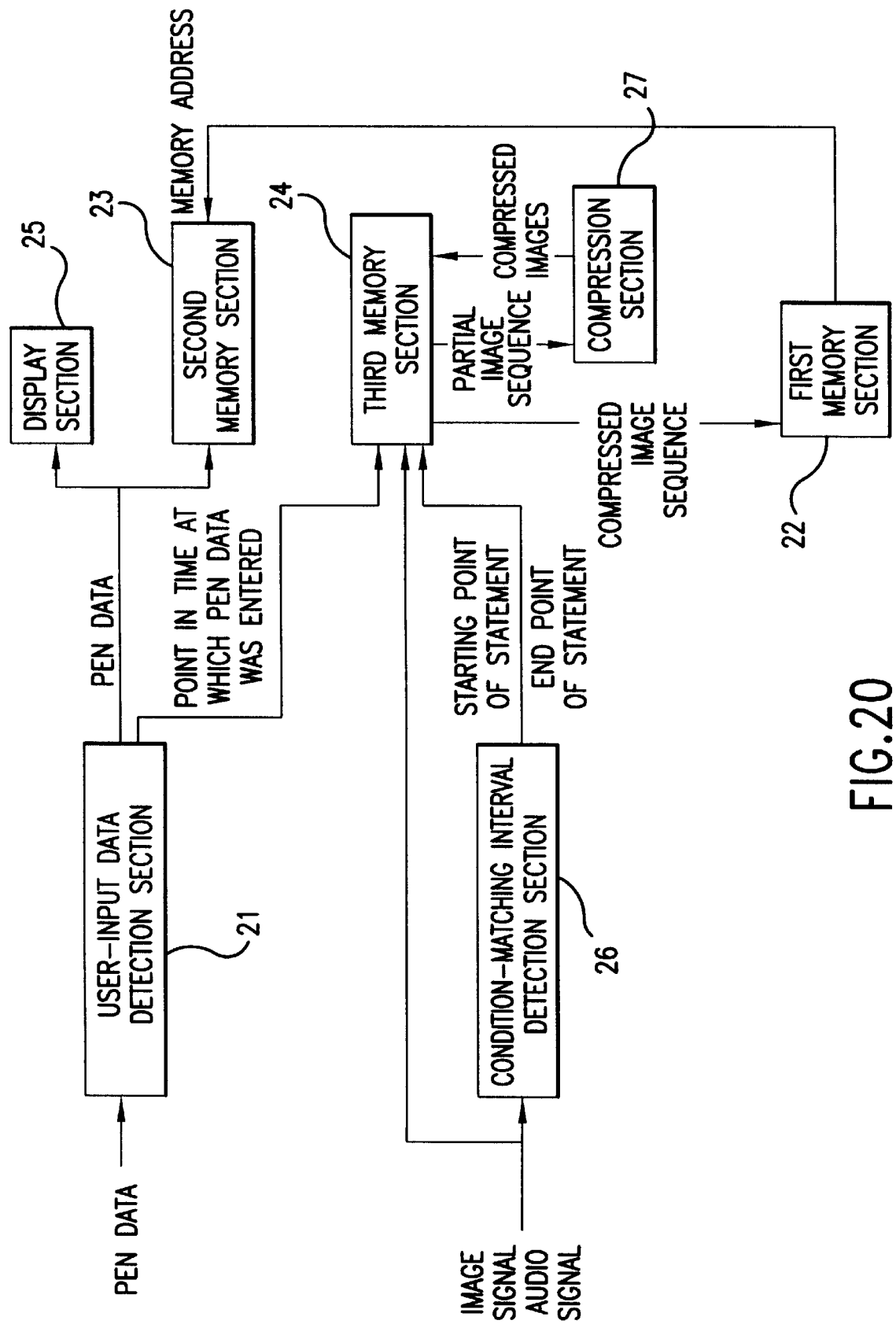
FIG. 20 is a drawing describing a summary of the recording operation performed by the third embodiment.

FIG. 20 describes the operations of the third embodiment. In the third embodiment, third memory section 24 is used to simultaneously store image data that is not compressed along with image data that has been compressed.

For example, if a 10-frame image-sequence is received in a single time unit, third memory section 24 would contain an uncompressed, 10-frame image data sequence, as well as a single frame image resulting from $\frac{1}{10}$ compression by compression section 27. Thus, when image data sequences are received in units of 10 frames, each sequence is sent from third memory section 24 to compression section 27, where the compression operation using dropped frames is performed as described above. Then, the compressed data is returned from compression section 27 to third memory section 24 and saved. Furthermore, third memory section 24 saves the data indicating both statement starting points and statement end points from condition-matching interval detection section 26.

When the entry of user-input data is detected, the section of the image data determined by the timing at which the user-input data was entered is transferred from third memory section 24 to first memory section 22. At this point, an uncompressed, 10-frame image data sequence is selected from the image data within a statement interval beginning with a statement starting point and ending with a statement end point. The selected 10-frame image data sequence is transferred to first memory section 22. The image data outside of the statement interval is compressed through dropped frames, and the remaining single frame image is transferred to first memory section 22.

When image data is transferred from third memory section 24 to first memory section 22, the data does not need to pass through compression section 27 to be compressed. Instead, the image data is directly transferred from third memory section 24 to first memory section 22.

Figure 21:
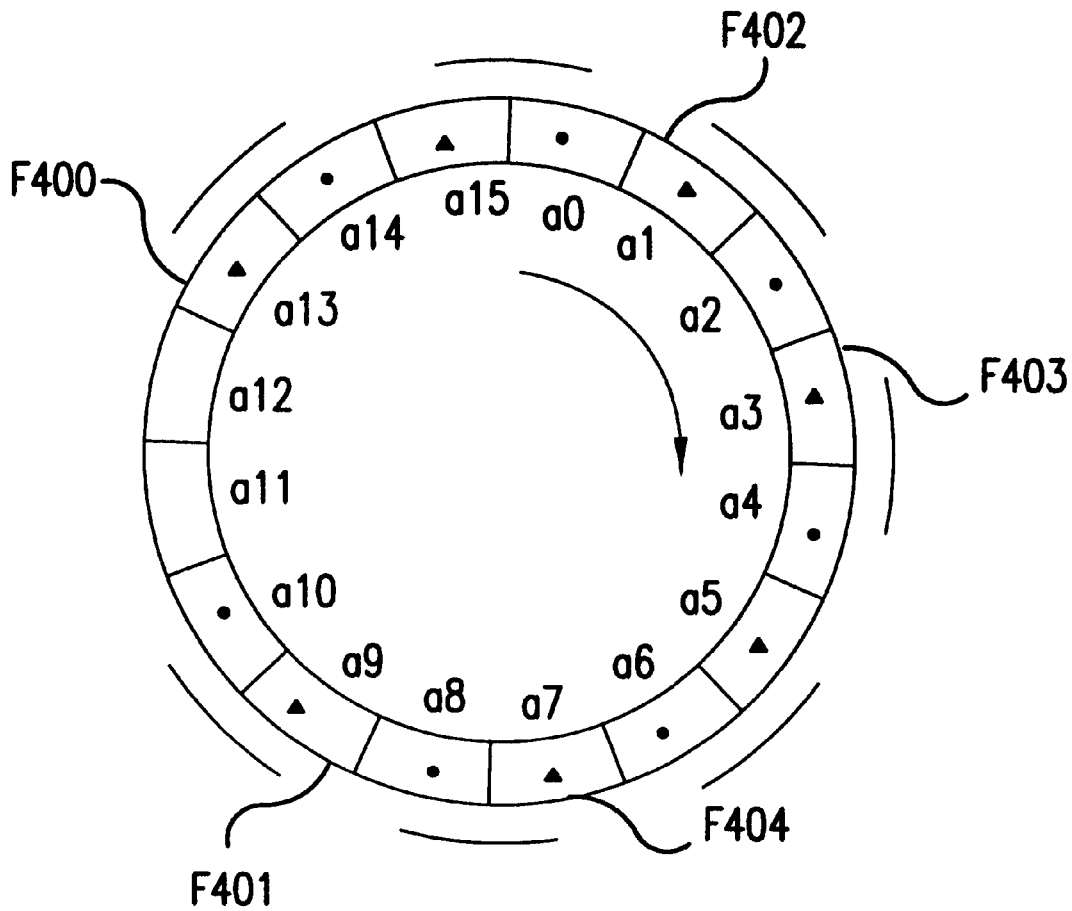
FIG. 21 shows a sample configuration of the third memory section in the third embodiment.
Figure 22:
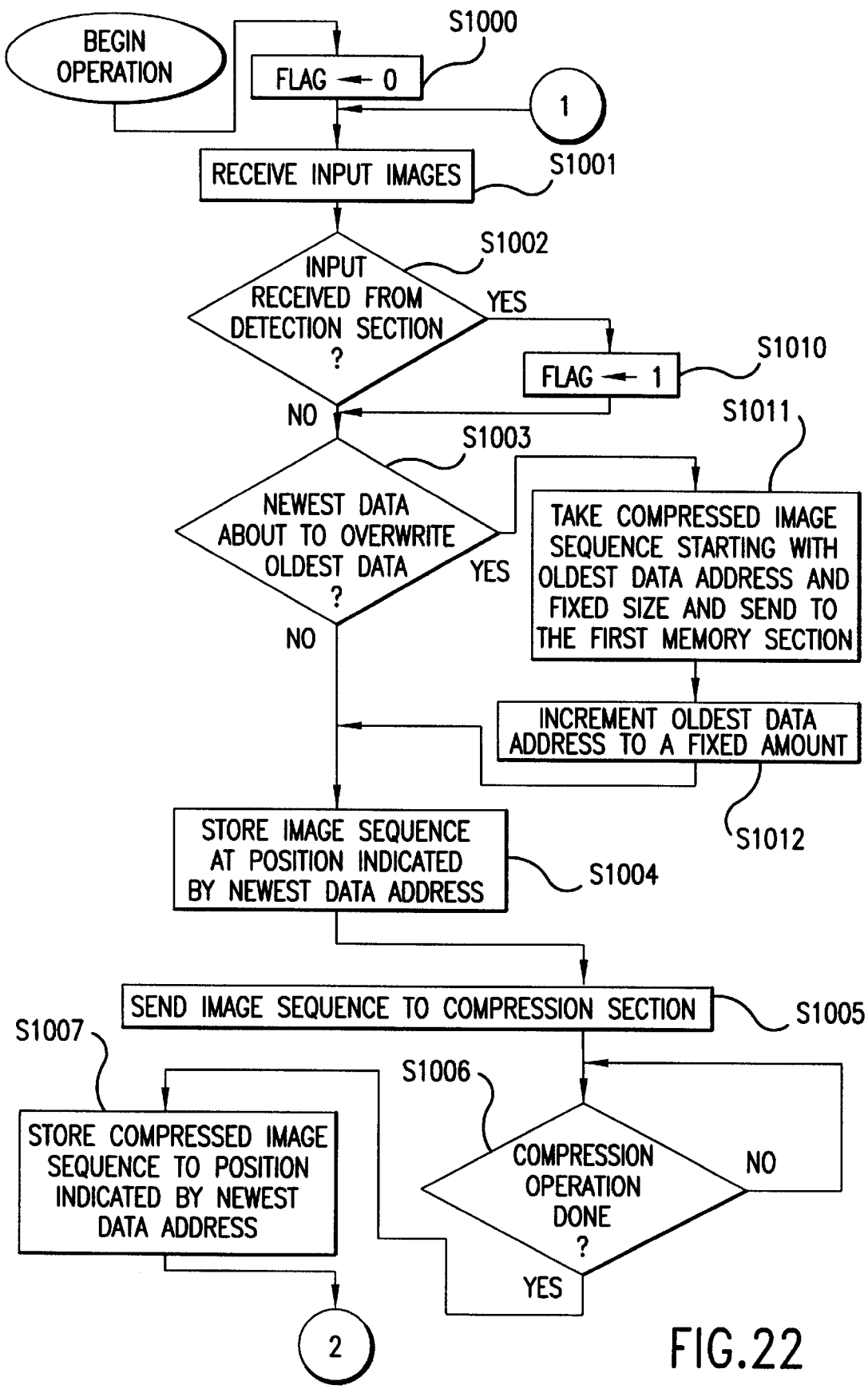
FIG. 22 is a section of a flowchart of the operation of the third memory section of the third embodiment.
Figure 23:
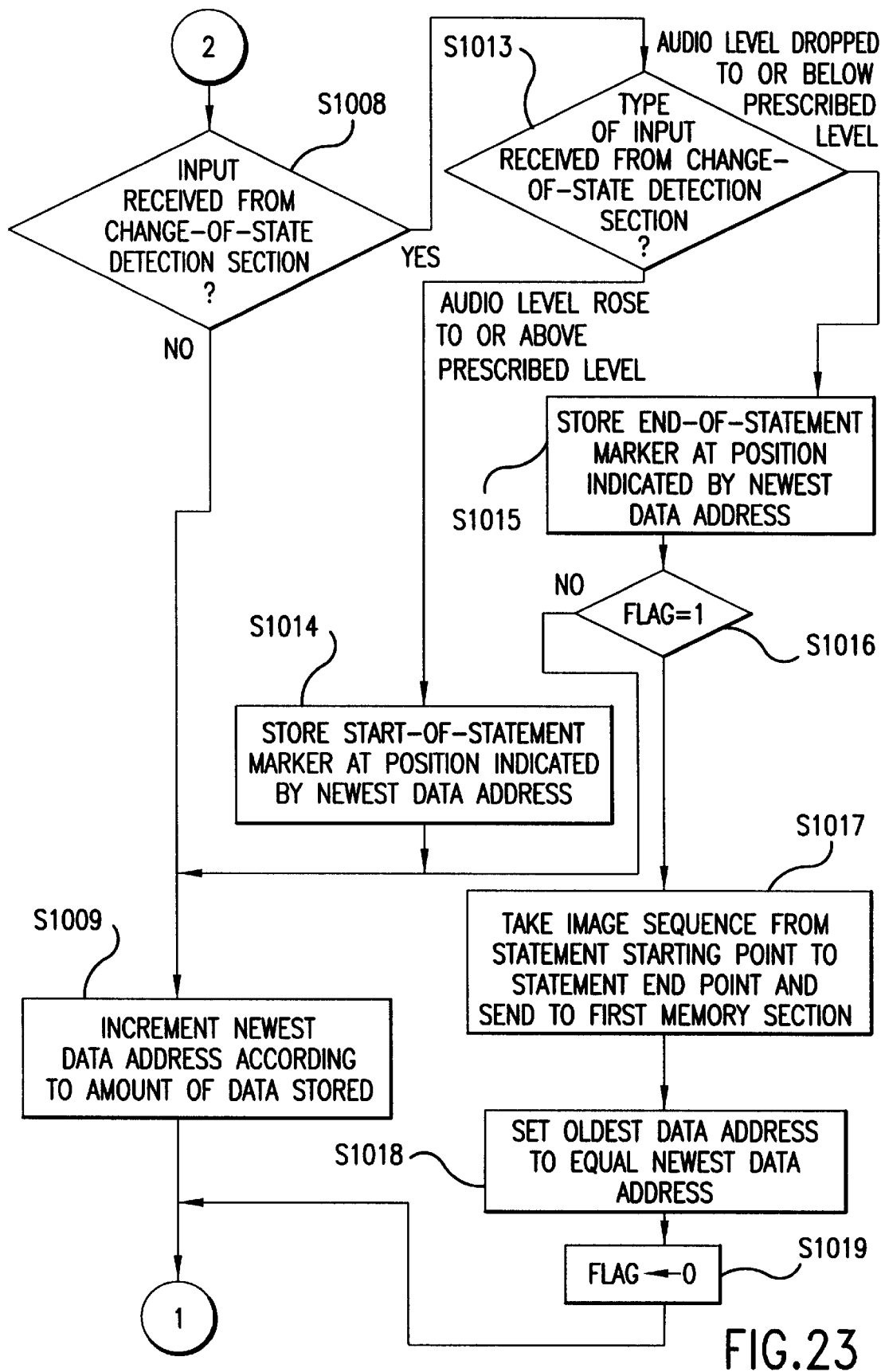
FIG. 23 is a section of a flowchart of the operation of the third memory section of the third embodiment.
Figure 24:
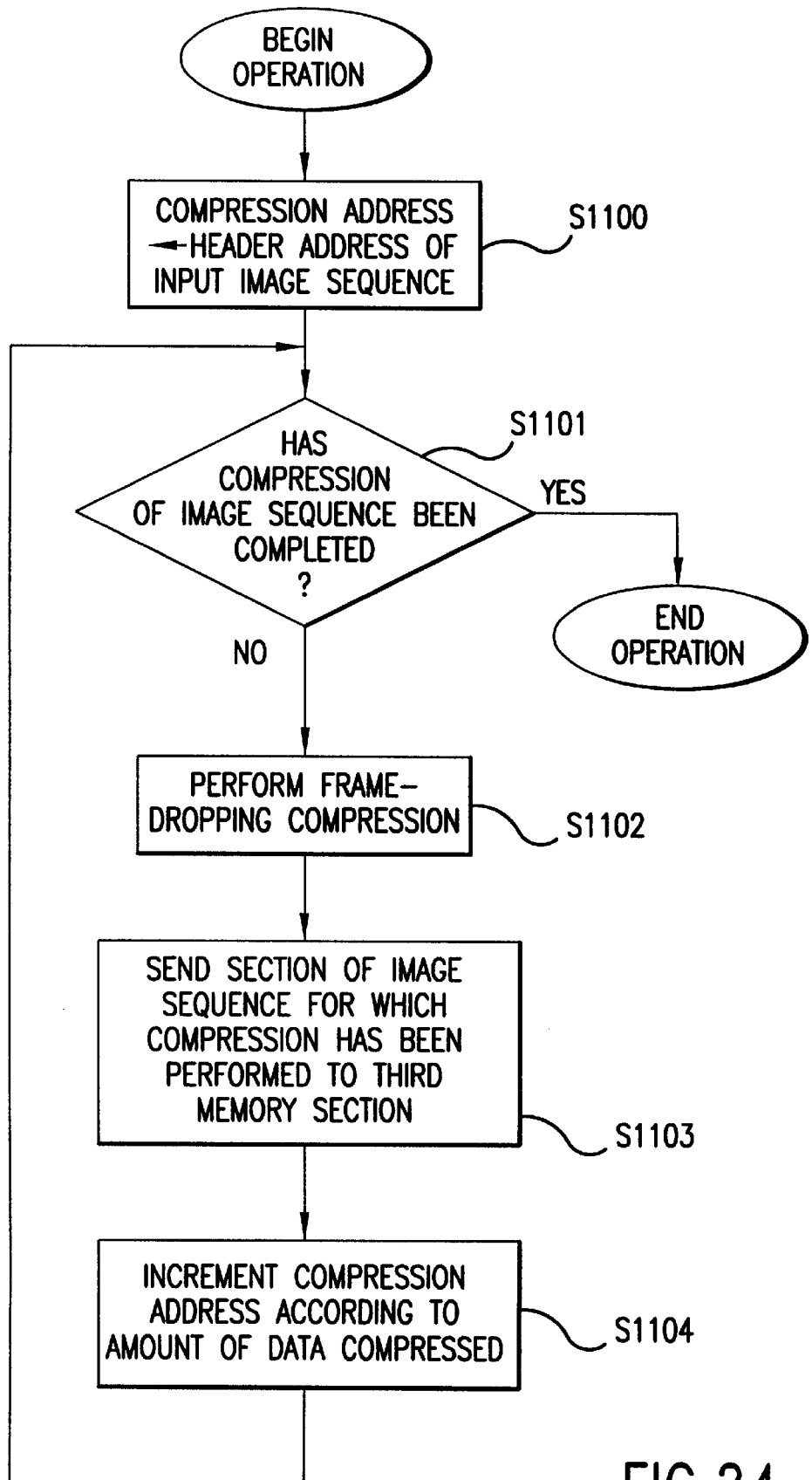
FIG. 24 is a flowchart of the operation performed by the compression section of the third embodiment.

Referring to FIG. 21, there is shown a drawing for the purpose of describing the memory structure of third memory section 24. FIG. 22 and FIG. 23 are flowcharts describing the operations involving third memory section 24. FIG. 24 is a flowchart describing the operations of compression section 27 from the third embodiment.

In these flowcharts, the flag is set to "1" to indicate that user input has been detected, and the flag is set to "0" to indicate that user input has not been detected.

First, at step S1000, the flag is reset to "0". Next, at step S1001, a single time unit's worth of images are received, e.g. a 10-frame image data sequence. Step S1002 determines whether detection output from user-input data detection section 21 is present. If user-input data is detected, control proceeds to step S1010, the flag is set to "1", and control proceeds to step S1003. If no user-input data is detected, the flag remains set to "0", control proceeds to step S1003.

Step S1003 checks to see if the newest data overwrites the oldest data in the ring buffer. If this is the case, control proceeds to step S1004. The uncompressed 10-frame image data sequence that was received is stored in third memory section 24 at the address indicated by the newest data address. Control then proceeds to step S1005. Next, at step S1005, the 10-frame image data sequence that was received is sent to compression section 27. Control then proceeds to S1006, and the completion of the compression operation by compression section 27 is awaited.

Compression section 27 will perform compression through dropped frames on this image data sequence, compressing the sequence into a single frame. Then, the compressed image will be returned to third memory section 24. Therefore, at step S1007, the compressed image data is stored in third memory section 24 at the location immediately after the 10-frame, uncompressed image data sequence saved at step S1004.

Referring to FIG. 21, the following is a description of the operations performed from step S1004 to step S1007. At step S1004, the 10-frame, uncompressed image data sequence is stored in third memory section 24 at memory a9 indicated by newest data address F401. Then, at step S1007, the single frame compressed image compressed using frame-dropping by compression section 27 is stored in memory a10, which immediately follows the 10-frame, uncompressed image data sequence. Here, the memory capacity of memory a9 and memory a10 are not identical, with memory a9 having 10 times the memory capacity of memory a10.

After step S1007 is completed, step S1008 checks to see if data indicating a statement starting point or a statement end point has been received from condition-matching interval detection section 26. If data indicating a starting point or an end point was detected, control proceeds from step S1008 to step S1013, and the data from condition-matching interval detection section 26 is evaluated to see whether it indicates a statement starting point or a statement end point.

If the data indicates a statement starting point, where the audio level changes to a level at or higher than a prescribed level, then control proceeds to step S1014, where the statement starting point marker is stored in the memory position indicated by the newest data address. Then, control proceeds to step S1009.

If, at step S1013, it is determined that the data indicates a statement end point, where the audio level changes to a level at or below a prescribed level, then control proceeds to step S1015, where a statement end point marker is stored in the memory position indicated by the newest data address. After step S1015, control proceeds to step S1016, which checks to see if the flag is set to "1". If the flag is set to "1", then control proceeds to step S1009.

If step S1016 determines that the flag is set to "1", i.e. that user-input data was detected, then control proceeds to step S1017. From the image data sequence stored in third memory section 24, an image data sequence beginning with the image frame from the statement starting point preceding the detection of user-input data and ending with the image frame from the statement end point, is selected. The selected image data sequence is sent to first memory section 22. Then, control proceeds to step S1018, and the oldest data address is equated with the newest data address to clear third memory section 24. Then, control proceeds to step S1019, where the flag is reset to "0". Control then returns to step S1001.

If, at step S1008, it is determined that there is no detection output from condition-matching interval detection section 26, then control proceeds to step S1009. At step S1009, the newest data address is incremented according to the size of the saved data. Then, control returns to step S1001.

Referring to FIG. 21, the following is a description of the operation performed at step S1009. It is assumed that the newest data address pointed to memory a9 when no image data input was present. At step S1004, a 10-frame, uncompressed image data sequence is saved to memory a9. At step S1007, a single compressed image is saved to memory a10. In this case, the newest data address would be incremented to memory a11.

If user-input data detection section 21 does not detect entry of pen-input data at step S1002, and data from third memory section 24 is about to be erased at step S1003 (the newest data is about to overwrite the oldest data), then only the compressed image from the fixed amount of image data is sent to first memory section 22 at step S1011. In other words, from the image data having a fixed, pre-determined size, the uncompressed image data sequence is not sent to first memory section 22 and is discarded. Then, control proceeds to step S1012, and the oldest data address is incremented by the fixed, pre-determined amount. Then, control proceeds to step S1004, and the operations described above are repeated.

In the embodiment above, the description covered cases where non-compressed image data sequences and compressed image data sequences compressed by compression section 27 are both stored in adjacent memory positions within the same memory section. However, the present invention is not restricted to this example, and it would be possible, for example, to have the non-compressed image data sequence and the compressed image data sequence stored in separate temporary memory sections. In such cases, the data from condition-matching interval detection section 26 indicating statement starting points and statement end points would be sent to both temporary memory sections.

Another possibility would be to take the continuously incoming image data and continuously compress and store the data in third memory section 24. At the same time, an uncompressed image data sequence, for which no compression is performed, is saved directly to first memory section 22. When user-input data detection section 21 detects pen-input data, the uncompressed image data sequence stored in first memory section 22 is left unchanged in first memory section 22, and the compressed image data sequence stored in third memory section 24 is erased from third memory section 24.

In this case, if user-input data detection section 21 does not detect pen-input data, and the compressed image data sequence is about to be erased from third memory section 24, then the uncompressed image data sequence, saved in first memory section 22 at the same time as the compressed image data sequence to be erased was saved, is overwritten by the compressed image data sequence that was about to be erased. This configuration eliminates the need to copy large amounts of image data from third memory section 24 to first memory section 22.

Another alternative would be to take the continuously incoming image data and save the data directly to third memory section 24 without compression. At the same time, a compressed image data sequence compressed through frame-dropping is saved to first memory section 22. When pen-input data is detected by user-input data detection section 21, then the compressed image data sequence stored in first memory section 22 is overwritten by the uncompressed image data sequence stored in third memory section 24.

In this case, if user-input data detection section 21 does not detect pen-input data, and the compressed image data sequence is about to be erased from third memory section 24, then the uncompressed image data sequence, saved in first memory section 22, is left unchanged, and the uncompressed image data about to be overwritten in third memory section 24 is erased. With this configuration, the need to copy large amounts of image data from third memory section 24 to first memory section 22 is eliminated.

Thus, the third embodiment covers configurations where uncompressed image data and compressed image data based on the same incoming image data are both saved either in a single memory section or in separate memory sections.

FIG. 24 is a flowchart describing the operation of compression section 27 in the third embodiment. This flowchart is a simplified version of the flowchart shown in FIG. 10.

First, initialization is performed at step S1100, and the compression address is set to the header address of the incoming image data sequence. Then, step S1101 checks to see if the compression of the incoming image series has been completed.

If, at step S1101, it is found that compression has not been completed, then control proceeds to step S1102. If compression has been completed, then this compression operation is exited.

At step S1102, the compression operation using the dropping of frames described above is performed. Then, at step S1103, the portion of the image data sequence for which compression has been completed is sent to third memory section 22. Then, at step S1104, the compression address is incremented according to the amount of data compressed. After step S1104, control returns to step S1101, and the steps described above are repeated.

In the third embodiment configured as described above, compression must be performed regardless of the timing of pen-data entry, and compression section 27 sends compressed image data sequences to third memory section 24. Once compression section 27 has performed frame-dropping compression, the compressed images are written to third memory section 24 (step S1103 in FIG. 24).

As in the first and second embodiments, in the third embodiment, the statement starting point closest to the newest data address in third memory section 24 can be used as the header address of the compressed image data sequence, or the n-th statement starting point before the newest data address can be used as the header address of the compressed image data sequence, where n is a prescribed value. Furthermore, in this embodiment, the statement end point immediately after the detection of pen-data input is used as the end address, but it is also possible to use the n-th statement end point after detection as the end point, where n is a prescribed value.

In the first, second, and third embodiments described above, condition-matching interval detection section 26 operates based on the condition of detecting the beginnings and ends of statements, and the detection results are used to specify intervals where characteristic events take place. However, the events detected by condition-matching interval detection section 26 are not restricted to these characteristic events.

In the fourth embodiment, the data storage/playback device automatically identifies the speaker and the audio or image signals are compressed using compression ratios based on the identified speaker.

The method used to identify a speaker can involve identification based on characteristics of the audio signals (voiceprints, or the like), or can involve identification based on the facial and mouth motions of the speakers determined from the image data. Also, individual microphones can be set up for each speaker. Each microphone can be identified as corresponding to a particular speaker. Alternatively, the audio input levels from each of the speakers microphones can be compared, and the phase differences between the audio signals can be analyzed. Thus, the audio signals from multiple microphones can be analyzed, and the position of the sound source can be determined to identify the speaker.

In the following description of the operations of the fourth embodiment, there are two speakers: a speaker A and a speaker B. The statements from speaker A have a greater importance compared to the statements from speaker B.

Figure 25:
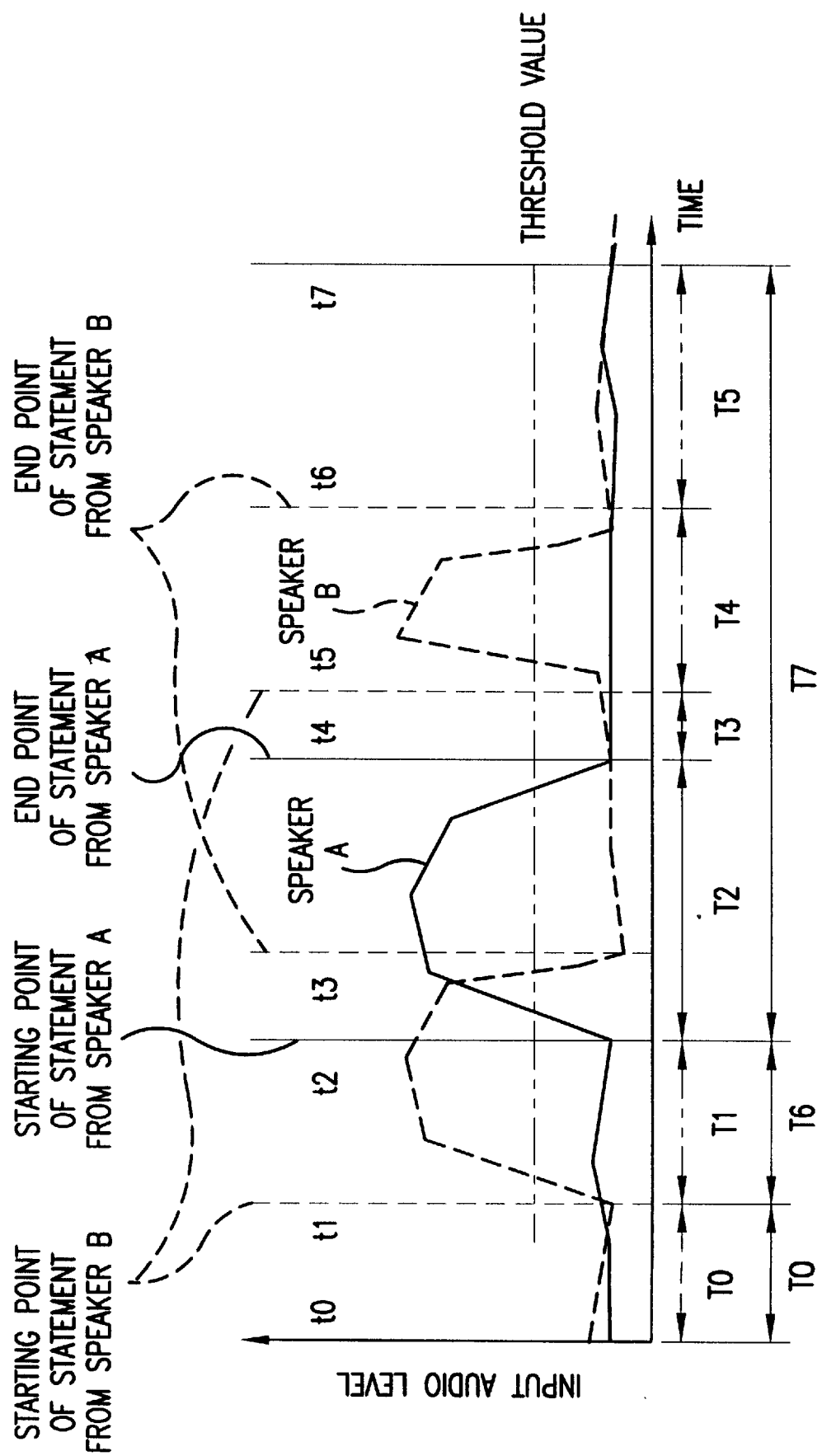
FIG. 25 illustrates the operation for compressing an image signal using a compression ratio based on the speaker, as used in the fourth embodiment.

FIG. 25 describes the operation of condition-matching interval detection section 26 in the fourth embodiment. Condition-matching interval detection interval 26 of the fourth embodiment can detect the statement starting points and the statement ending points of statements from the speakers.

Also, in the fourth embodiment, the frame-dropping compression ratio can be set separately for each speaker. The settings data for the speakers are handled by a control section 30. In the following description, the frame-dropping compression ratio for saving statements from speaker A is pre-set to 10 frames/second. The frame-dropping compression ratio for saving statements from speaker B is pre-set to 5 frames/second.

Furthermore, in the fourth embodiment, when there are multiple statements from speakers that overlap, it is possible to make settings to prioritize the frame-dropping compression ratio of the speakers. In this example, when a statement from speaker A is detected at the same time as a statement from speaker B, the incoming image is compressed at the compression ratio used for storing the statements from speaker A.

Referring to FIG. 25, if pen-input data is entered at any time during an interval T2, which is a statement interval from speaker A, the image signal in interval T2 is recorded at 10 frames/second. The remaining intervals T0, T1, T3, T4, and T5 are recorded at 1 frame/second. The image signal is recorded at a high quality beginning with a statement starting point t2 from speaker A, so when the statement from speaker A is played back, the playback is performed at a high image quality beginning with statement starting point t2.

Also, when pen-input data is entered during interval T4, which is a statement interval from speaker B, then the image signal from interval T4 is recorded at 5 frames/second. The remaining intervals T0, T1, T2, T3, and T5 are recorded at 1 frame/second. Similarly, when pen-input data is entered at any time during interval T1, which is a statement interval from speaker B, then the image signal from interval T6 is recorded at 5 frames/second, and the remaining intervals TO and T7 are recorded at 1 frame/second.

With the embodiment described above, it is possible to store all the audio or image signals from a particular speaker at a high sound quality/high image quality, and to rewind to a point in time when the speakers changed and begin playback from there.

Also, in the fourth embodiment, it is possible to combine multiple detection results from condition-matching interval detection section 26. The results are used to determine the degree of importance of the audio data or image data saved along with the user-input data. Based on the degree of importance, the compression ratio is varied in sections when the audio or image signal is compressed.

In the fifth embodiment, condition-matching interval detection section 26 detects the appearance of a keyword entered beforehand in the incoming audio signal or the appearance of an audio pattern entered beforehand in the incoming audio signal.

The following is a description of a case where condition-matching interval detection section 26 detects the appearance of a keyword entered beforehand in the incoming audio signal.

In this case, condition-matching interval detection section 26 comprises: an audio recognizing means; a memory for storing entered keywords; and keyword-matching means detecting comparing and detecting matches between the results of audio recognition and keywords entered beforehand in memory. The user enters keywords in memory beforehand.

When data is being stored by the data storage/playback device, condition-matching interval detection section 26 uses audio recognizing means to continuously convert the incoming audio signal into text data. Through analysis of morphemes or the like, phrases are extracted from the text data. The extracted phrases are then compared with text keywords entered beforehand in memory such as "homework", "action item", "topic", "conclusion", "decision", "important", "summary".

If a phrase extracted from the incoming audio signal matches one of the text keywords entered beforehand, then a data address indicating the point in time that the word was entered (the point in time that the phrase was detected) is stored temporarily along with the image data in third memory section 24. The point in time that the text keyword was detected is set to be a starting point of a condition-matching interval.

In the fifth embodiment, the end point of the condition-matching interval is determined by having a keyword interval linked to each keyword and saved in memory. The keyword interval determines how long the image signal will be recorded at high image quality once the keyword is detected.

Figures 26, 27:
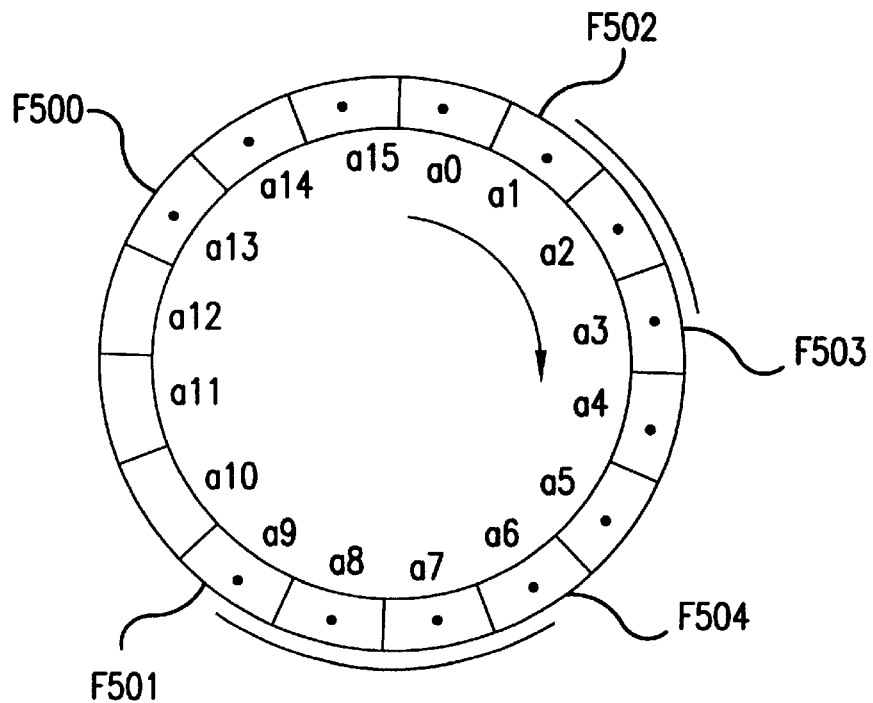
FIG. 26 illustrates the operation of the third memory section in the fifth embodiment wherein the appearance in the audio signal of keywords entered beforehand is detected.
FIG. 27 illustrates the operation of the third memory section in the fifth embodiment wherein the appearance in the audio signal of keywords entered beforehand is detected.

FIG. 26 shows an example of a table containing keywords and keyword intervals entered in memory. When a keyword is detected in the incoming audio signal, a data address indicating the point in time when the keyword was detected is saved in third memory section 24. If no user-entered data, such as pen data, is detected during the keyword interval corresponding to the keyword, a marker indicating that the keyword interval has expired is saved to third memory section 24.

FIG. 27 describes the operation of third memory section 24 in the fifth embodiment. Referring to FIG. 27, the memory positions marked with a black dot are the memory positions at which no image data is saved. The unmarked memory positions are the memory positions where image data is saved.

When the entry of pen-input data is detected by user-input data detection section 21 (the point in time that the data is detected at newest data address F501) then an image data sequence stored in third memory section 24 is sent to compression section 27. The image data sequence begins with F504, when the keyword string is detected, and ends with F501, which is the newest data address.

Compression section 27 receives the image data sequence from F504, when the keyword string is detect, to F501, the newest data address. This image data sequence is compressed using a lower compression ratio than that used in other sections. The resulting sequence with high image quality is stored in first memory section 22.

It is also possible to send to compression section 27 an image data sequence beginning when the n-th previous keyword string is received, where n is a prescribed number, (e.g. at F502), and ending at the image frame indicated by newest data address F501. In this case, the image data sequence beginning with F502 (when the keyword string was detected) and ending with F503 (when the keyword interval for the keyword expires), is compressed using a lower compression ratio than that used for other sections. Similarly, the image data sequence beginning with F504 (when the keyword string is detected) and ending with the image frame indicated by newest data address F501, is compressed using the lower compression ratio. The resulting image data sequences having high image quality are saved to first memory section 22.

Furthermore, it is also possible to have settings for each keyword string that indicates the degree of importance of the keyword string. As in the fourth embodiment described above, the image signal can be recorded at different compression ratios corresponding to the degrees of importance of the keyword strings.

The following is a description of how condition-matching interval detection section 25 detects condition-matching intervals when the detection condition is based on the appearance in the incoming audio signal of audio patterns entered beforehand.

There are cases where the use of audio recognition to detect keywords may be difficult, but certain characteristic audio signal patterns such as patterns indicating laughter, patterns indicating applause, or patterns indicating excited conversation can be recognized. Therefore, in the fifth embodiment, condition-matching interval detection section 26 can also detect condition-matching intervals using detection conditions based on the appearance of these characteristic audio patterns.

In this case, condition-matching interval detection section 26 is equipped with a memory into which is stored beforehand characteristic audio signal patterns such as patterns indicating laughter, patterns indicating applause, or patterns indicating excited conversation. Also, condition-matching interval detection section 26 is equipped with a pattern recognition means that recognizes patterns using a known pattern recognition technology, such as a technology that analyzes the changes over time of the power or frequency components of an audio signal.

For example, this pattern recognizing means determines that excited conversation is taking place if the interval between the end of a statement from one speaker and the beginning of a statement from another speaker is short. Also, characteristic audio signal patterns are entered beforehand, and these patterns are compared with audio signals extracted from the continuously incoming audio signal. These characteristic patterns are recognized when the comparison determines a match or a similarity. The rate of recognition for the pattern recognition can be increased by entering separate audio patterns for each speaker.

When condition-matching interval detection section 26 recognizes that the pattern from an audio signal extracted from the incoming audio signal matches one of the patterns entered beforehand, then a data address indicating the point in time when the audio signal pattern was received is saved to third memory section 24.

In this manner, it is possible to use high image quality to record the audio signal or image signal from a characteristic audio signal. Also, it is possible to rewind the footage to the point in time at which the pattern was recognized and begin playing back from there. Of course, it is also possible to have compression section 27 compress an image data sequence beginning with when the n-th previous pattern was entered and ending with the image frame indicated by the newest data address.

Also, as in the case with keywords, it is possible to use a table as shown in FIG. 28 to set pattern intervals that determine for how long high quality recording will take place after the detection of the pattern. The image data sequence, beginning the detection of the characteristic audio pattern and ending with the expiration of the corresponding pattern interval, is saved to first memory section 22 using high image quality.

In this case, recognition of patterns in the incoming audio is performed by audio recognizing means in condition-matching interval detection section 26. The pattern interval is determined based on the results of the recognizing and the table in FIG. 28.

In addition, the degree of importance of each pattern can be set. As in the fourth embodiment, the image signal can be recorded using different compression ratios corresponding to the degree of importance of the characteristic audio patterns.

Thus, in the fifth embodiment described above, intervals in which either keywords or characteristic patterns are detected in the audio signal are recognized as condition-matching intervals. These condition-matching intervals can be stored in conjunction with user-input data.

In the sixth embodiment, condition-matching interval detection section 26 performs detection based on the appearance in the incoming image signal of a string entered beforehand or the presence of a change in the state of the incoming image signal.

The following is a description of condition-matching interval detection section 26 when a keyword entered beforehand appears in the incoming image signal.

In this case, condition-matching interval detection section 26 comprises: image recognition means; a memory for storing keyword string; and keyword-match detecting means comparing the results from image recognition and the keywords entered beforehand and detecting matches. The user enters keywords beforehand in the memory.

When data is being stored in the data storage/playback device, condition-matching interval detection section 26 uses image recognition means to continuously convert characters written on a whiteboard or the like, and phrases are extracted from the string data. The extracted phrases are compared with keyword strings entered beforehand such as "homework", "action item", "topic", "conclusion", "decision", "important and summary". If an electronic whiteboard displaying the output from a computer is used, and the displayed image signal is the output from the computer, then the data from the computer (character code data and the like) can be used as the incoming image signal.

If an extracted phrase matches one of the keyword strings entered beforehand, then a data address indicating when the phrase was received is stored. In this case, a starting point for a condition-matching interval is set to be the point in time when the keyword string is detected.

In order to determine the end point of the condition-matching interval, the sixth embodiment saves keyword intervals corresponding to the keyword strings in memory, as shown in FIG. 26. The keyword intervals determine how long the image signal will be stored at high quality after the detection of the keyword.

When a keyword is detected in the incoming image signal, a data address indicating when the detection occurred is saved in third memory section 24. If, during the keyword interval starting with when detection took place, no user-input data (such as pen data) is detected, then a marker indicating that the keyword interval has expired is saved in third memory section 24. The incoming image signal is saved to first memory section 22 using operations similar to the operations described for the fifth embodiment.

The following is a description of how condition-matching interval detection section 26 detects an interval based on when a change of state occurs in the incoming image signal.

There may be cases where it is difficult to detect keyword strings using image recognition, but changes in the state of the incoming image data, such as movement, changes in brightness, and changes in color distribution, can be detected. In the sixth embodiment, condition-matching interval detection section 26 can also use these changes of state in the image to detect condition-matching intervals.

In this case, condition-matching interval detection section 26 comprises: a memory in which change-of-state patterns of the image signal is entered beforehand; and pattern recognition means recognizing change-of-state patterns using known pattern recognition technologies. The recognition of additions or page changes made while a whiteboard or a drawn image is being recorded, can be achieved by using known technologies for detecting inter-frame differences, such as the one disclosed in Japanese laid-open publication number 4-286293.

The change-of-state patterns entered beforehand, as described above, are compared with changes of state in the image signals extracted from the continuously incoming image signals. If the change-of-state pattern in the extracted image signal matches one of the change-of-state patterns entered beforehand, then the a data address indicating the point in time that the change-of-state pattern was received is saved. The incoming image signal is then saved to first memory section 22 using the operations described above for the fifth embodiment.

In the seventh embodiment, condition-matching interval detection section 26 detects changes of state using external sensors.

An external sensor is used when detection of changes of state in the audio or image signal is made difficult, or for when a change of state occurs in information not contained in the incoming audio or image signal. For example, an infrared sensor can be installed at the entrance of a room, or a sensor can be attached to a door in order to monitor people coming in and out. The monitoring output is used as the detection output for condition-matching intervals. Also, manual signals (such as pressing a button) made by the person making the recording can be detected with a sensor.

In the seventh embodiment, condition-matching interval detection section 26 detects changes in the state of the continuously incoming signal from an external sensor, and compares the signal with change-of-state patterns entered beforehand. If the detected change-of-state pattern matches one of the change-of-state patterns entered beforehand, then a data address indicating the point in time when the change-of-state pattern was detected is saved to third memory section 24.

In the seventh embodiment, each pattern also has a pattern interval which determines how long image signals will be recorded at high quality after detection of the pattern. An image data sequence, beginning with the detection of the pattern and ending when the pattern interval has run out, is stored in first memory section 22 using high image quality.

Furthermore, it is also possible to set degrees of importance for each pattern. As in the fourth embodiment, the image signals can be recorded with compression ratios that correspond to the degree of importance of the pattern.

In the eighth embodiment, condition-matching interval detection section 26 detects camera movements (hereinafter referred to as camerawork) or changes in camerawork.

For example, the recording of a close-up of a person may indicate that the images are important, and it would be desirable to save the audio or image signals using high audio quality/high image quality during the interval in which the camera is zoomed in. The eighth embodiment provides this feature.

Figure 29:
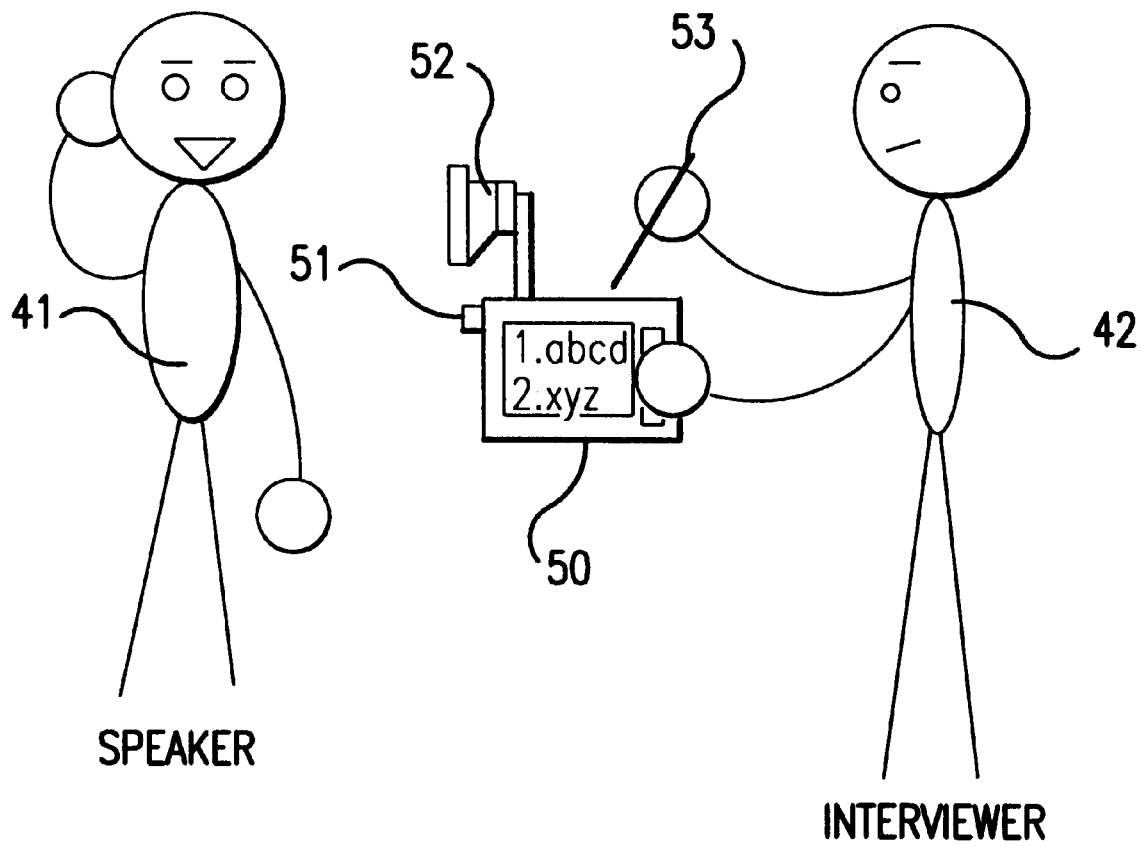
FIG. 29 shows an overview of a system in which the eighth embodiment is implemented.

FIG. 29 shows an outline of a system in which the data storage/playback device of the eighth embodiment is implemented. Referring to FIG. 29, the system is used to record interviews, where an interviewer 42 uses the system while interviewing a speaker 41.

This interview recording system comprises: a data storage/playback device 50 comprising a portable "pen computer"; a microphone 51 serving as audio data inputting means for data storage/playback device 50; a video camera 52 serving as image inputting means for data storage/playback device 50; and a touch panel and pen 53 serving as user-input means.

In this embodiment, the image data recorded using camera 52 is sent to data storage/playback device 50 along with camera usage data. Data storage/playback device 50 is structured with the same function blocks as shown in FIG. 1. Condition-matching interval detection section 26 analyzes the camera usage data to detect camerawork, such as panning of the camera, tilting, zooming, booming, trimming, dollying, beginnings of cuts, and ends of cuts. Changes in camerawork are also detected.

It would also be possible to perform image recognition on the incoming image signal in order to detect camerawork such as panning, tilting, zooming, booming, trimming, dollying, beginnings of cuts, and ends of cuts.

Figure 30:
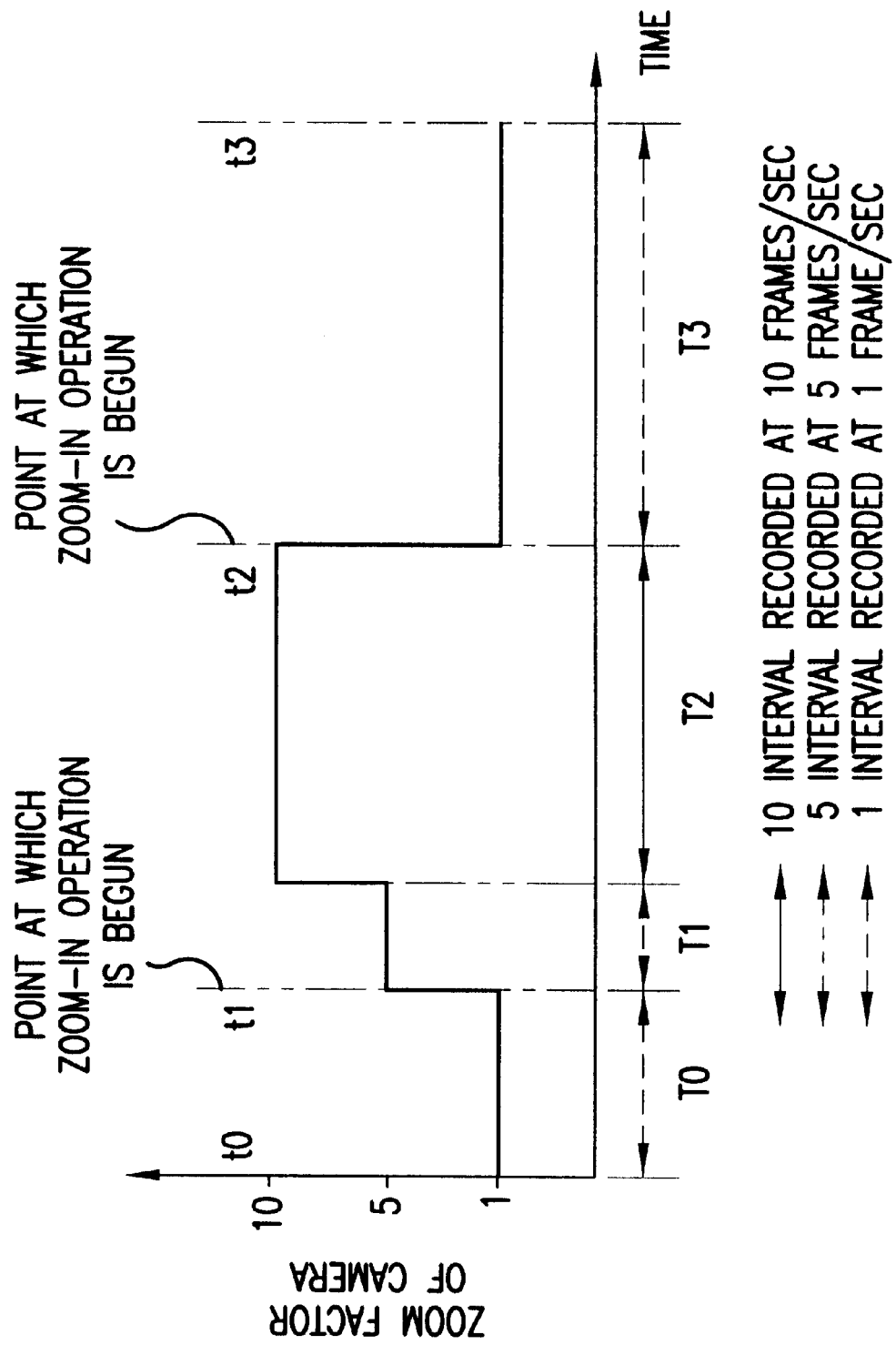
FIG. 30 illustrates the operation used to detect the zoom factor of the camera in the eighth embodiment.

FIG. 30 describes the operation of condition-matching interval detection section 26 used in the eighth embodiment.

In this example, condition-matching interval detection section 26 uses the zoom factor of the camera as the detection condition. Condition-matching interval detection section is equipped with a feature for detecting the zoom factor of the camera. Data indicating the zoom factor, based on manipulation of the zoom ring, is sent to data storage/playback device 50 as camera usage data. Condition-matching interval detection section 26 determines the current zoom factor of the camera from this camera usage data indicating the zoom factor.

In the eighth embodiment, the zoom factor of the camera can be set to three settings: 1×, 5×, and 10×. Frame-dropping compression ratios are set for each zoom factor mode respectively as 1 frame/sec, 5 frames/sec, and 10 frames/sec.

Also, in the eighth embodiment, as in the third embodiment, the continuously incoming image signal is compressed according to the detection results from condition-matching interval detection section 26. The compressed image data is stored in third memory section 24.

The incoming image signal is compressed using a compression ratio determined from the detection results of condition-matching interval detection section 26, and the resulting compressed image data is stored in third memory section 24. Referring to FIG. 30, if pen-data is entered at any time during interval T2, third memory section 24 waits for the zoom-in operation to finish. Referring to FIG. 30, an image data sequence from the image data sequence stored in third memory section 24 is sent to first memory section 22. This image data sequence begins at time t1, when the zoom-in operation is begun, and ends at time t2, when the zoom-in operation is completed. In this case, interval T1 is stored at 5 frames/sec, interval T2 is stored at 10 frames/sec, and the other intervals are stored at 1 frame/sec in first memory section 22.

As described above in the eighth embodiment, it is possible, based on the camerawork or changes in the camerawork, to store image data for important scenes and image data for unimportant scenes using different compression ratios. Also, as described above, it is possible to compress audio or image signals using different levels of compression ratios according to the detection results from condition-matching interval detection section 26.

Figure 31:
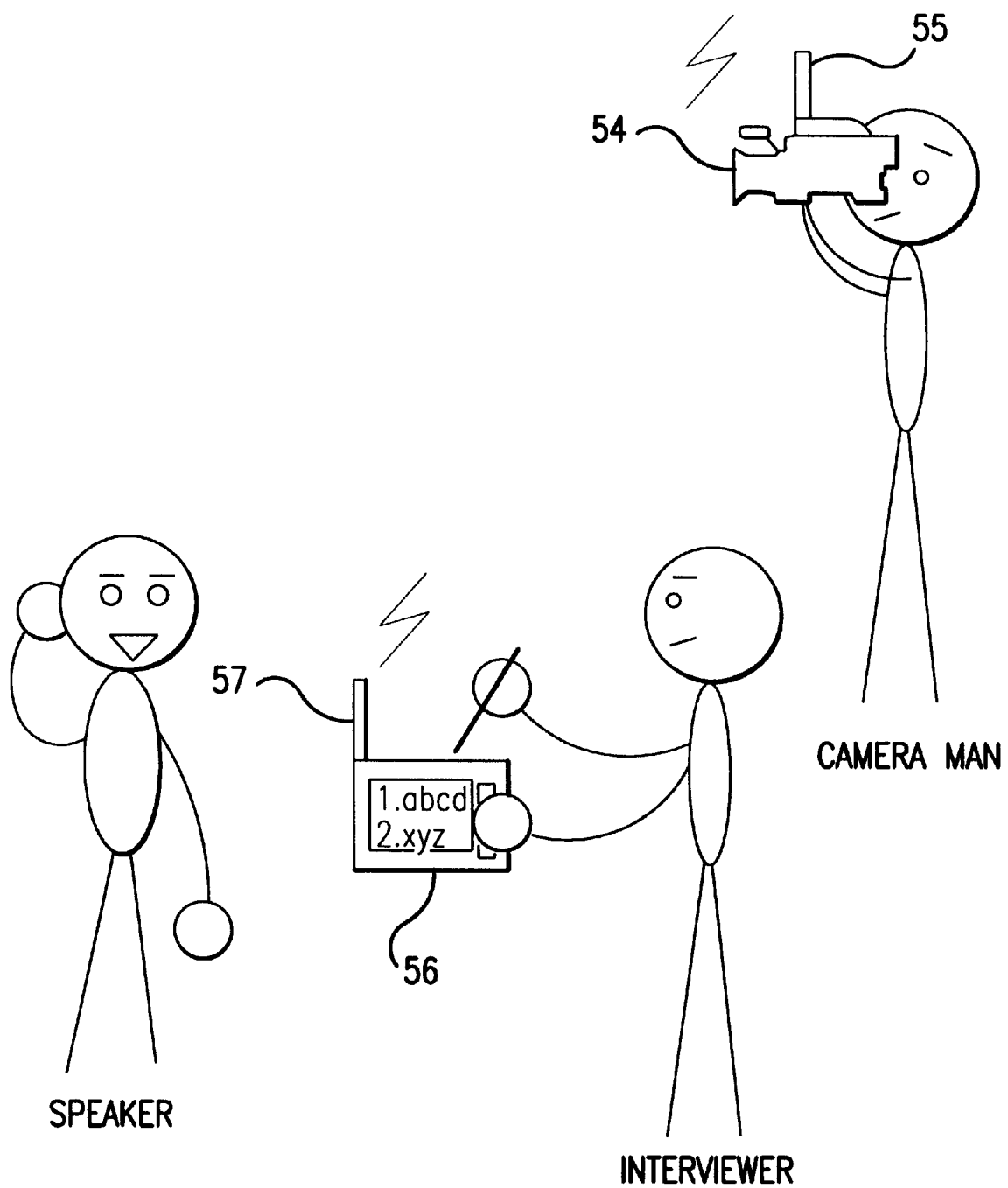
FIG. 31 shows an overview of another system in which the eighth embodiment is implemented.

Referring to FIG. 29, the interview recording system may be structured so that the data storage/playback device and the video camera are formed integrally. Referring to FIG. 31, it would also be possible to have the data storage/playback device and the video camera formed separately.

Referring to FIG. 31, in this example, a data storage/playback device 56 comprises a user-input detection section 21; a second memory section 23; a display section 25; and a playback specification section 28. Video camera 54 comprises: a condition-matching interval detection section 26; a first memory section 22; a third memory section 24; and a playback section 29. User-input data detection section 21 in data storage/playback device 56 detects user-input data. When user-input data is detected, a radio signal from a transmission antenna 57 on data storage/playback device 56 to a reception antenna 55 on video camera 54. Video camera 54 receives this signal, and the image data received by camera 54 when the signal was received is stored in first memory section 22 using a frame-dropping compression ratio corresponding to the zoom factor of camera 54 at the time.

Then, the memory address in first memory section 22 for the image data stored in first memory section 22 is sent as radio signals from transmission antenna 55 on video camera 54 to reception antenna 57 on data storage/playback device 56. The image data is linked to the user-input data detected by user-input detection section 21 and saved to second memory section 23.

In the ninth embodiment, the degree of importance of the user-input data is determined based on the detection results from user-input data detection section. Based on this degree of importance, the compression ratio for certain sections is changed.

User-input data to be considered important may include pen-input written in red, circled text, underlined text, and the like. These characteristics of user-input data are entered beforehand. User-input data detection section 21 compares these characteristics with the user-input data entered by the user and checks to see if the user-input data matches any of the characteristics. The results of this comparison are sent to third memory section 24 and stored. Thus, in the ninth embodiment, the output from user-input data detection section 21 is sent to third memory section 24.

Referring to FIG. 13 (A), the following is a description of the operation of the ninth embodiment when pen-data written in red is considered to be important user-input data.

When user-input data detection section 21 detects entry of pen data, user-input data detection section 21 checks to see if the entered pen data is in red.

Referring to FIG. 13 (A), if the data is in a color other than red, the image signals from the interval between time t1 and time t2 are stored in first memory section 22 at 10 frames/sec. However, if the data is in red, then the image signals from the same interval are stored in first memory section 22 at 30 frames/sec.

It would also be possible to use the following method. If the color is not red, the interval from time t1 to time t2 is stored in first memory section 22 at 10 frames/sec, but if the color is red, the interval from preceding statement starting point t0 to t2 is stored in first memory section 22.

The description above assumes that a single person is entering the user-input data. However, it would also be possible to detect user-input data from a plurality of users. In such cases, the computer in the data storage/playback device may be connected to a network, or a plurality of input terminals may be connected to the data storage/playback device.

For example, a plurality of meeting participants may be in a meeting room, with each participant taking notes on the meeting. In this case, there will be a wide variation in the user-input data entered by each individual, as well as the timing at which the individuals enter the user-input data. For example, Japanese laid-open publication number 6-343146 describes a method for recording/storing audio signals for each meeting participant separately. However, if the meeting room is being recorded with a single camera and a single microphone, it is difficult to maintain the data for reproducing the audio or image signals for each individual.

User-input data detection section 21 is set up to detect user-input data entered by a plurality of users. The incoming audio or image signals are stored together in first memory section 22. This eliminates the need to store separate audio or image data for each individual, thus saving memory capacity.

The detected user-input data can be stored for each participant in separate second memory sections 23, or they can be stored in the same second memory section 23.

Figure 32:
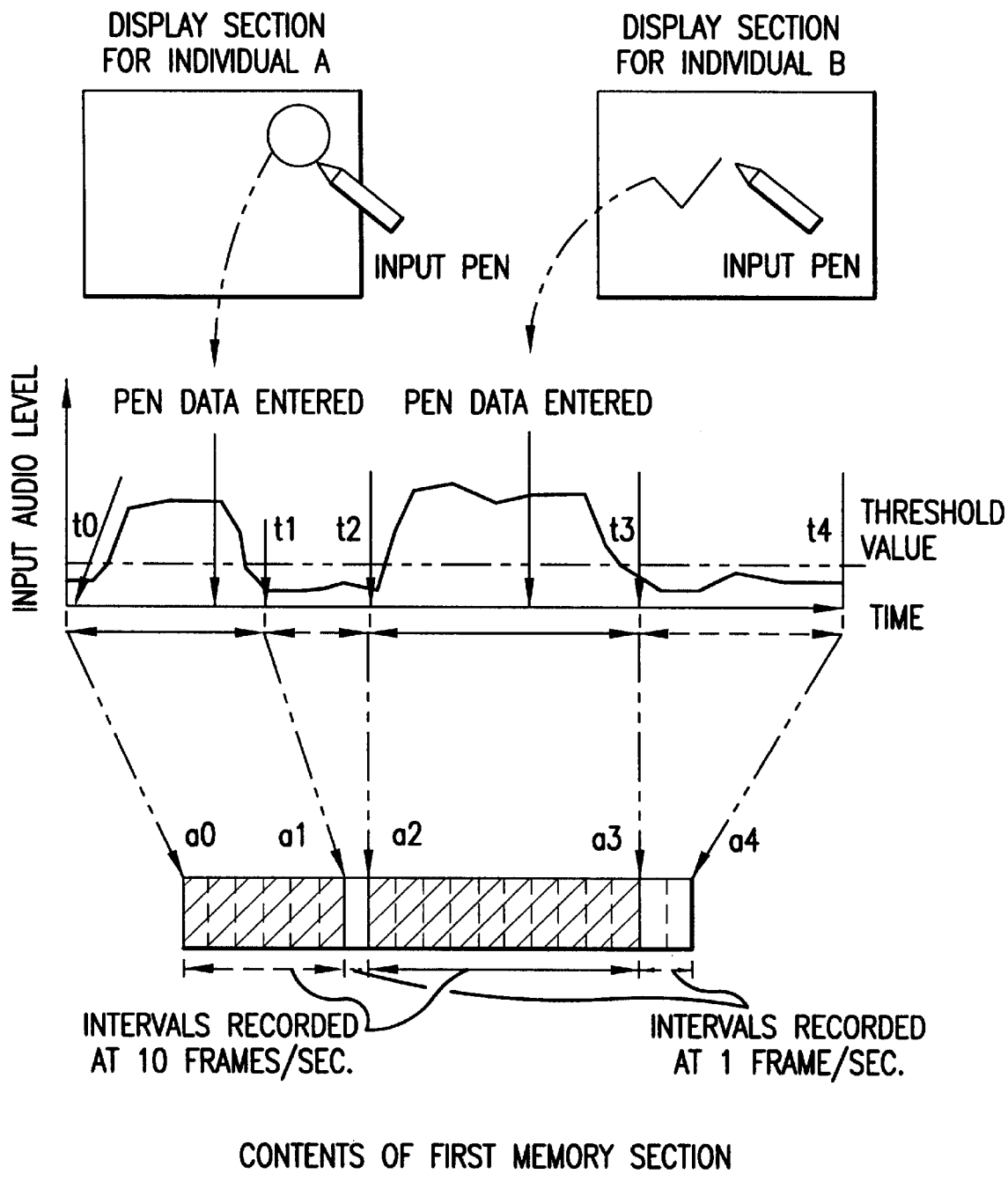
FIG. 32 illustrates the operation performed by the tenth embodiment in order to detect user-input data entered by a plurality of users.

Referring to FIG. 32, there are two individuals: an individual A and an individual B. In the drawing, pen data is entered at unrelated moments. Individual A enters pen data during the interval between statement starting point t0 and statement end point t1. During the interval between time t0 and time t1, the image data is saved in addresses a0–a1 in first memory section 22 at 10 frames/second. Also, individual B enters pen data during the interval between statement starting point t2 and statement end point t3. The image data during the interval between time t2 and time t3 is saved in addresses a2–a3 in first memory section 22 at 10 frames/sec.

Outside these intervals, during time t1–t2 and time t3–t4, the image data is stored at 1 frame/sec, and is stored in first memory section 22 at addresses a1–a2 and a3–a4.

Referring to FIG. 32, the incoming image data is not stored separately in separate first memory sections 22, but rather the data is stored in a single first memory section 22. Thus, there is no need to store audio or image data separately for each user.

Also, important users can be determined beforehand out of the plurality of users. By identifying the individual or the input terminal, the degree of importance of the user-input data can be determined. Then, the compression ratio can be varied for certain sections based on the degree of importance, as in the ninth embodiment.

When individuals or input terminals are identified in this manner, it is also possible when playing back audio or image signals to vary the sections in which frame dropping is performed for each individual. For example, if individual A issues a playback request, the interval between time t0 and time t1 in FIG. 32 can be played back at normal speed (the speed at which the recording was made), and the other intervals can be played back at double speed. If individual B issues a playback request, the interval between time t2 and time t3 would be played back at normal speed, and the other intervals would be played back at double speed.

In addition to the above-described ten embodiments, it is possible to implement other combinations of the embodiments. For example, the third embodiment was described as a variation on the second embodiment, but the same variations could be applied to the first embodiment. Also, the fourth through tenth embodiments can all be modified as variations on the first, second, or the third embodiment.

According to the above-described ten embodiments, several advantages may be achieved. By storing audio or image data from a specific interval specified based on detection results from a condition-matching interval detection section and a user-input data detection section, it is possible to store the entire audio or image signals from the time user input is received and during the interval for which a characteristic event is taking place. Playback can be begun from the start of the interval during which the characteristic event is taking place.

In the present invention, audio or image signals are compressed by dynamically varying the compression ratio or time intervals for interrupted recording based on the detection results from the condition-matching interval detection section and the user-input data detection section. This makes it possible for sections of the audio or image signal deemed important based on the timing of user input to be stored with a relatively large amount of data within the limited storage medium. Also, the audio or image signals that are outside the important sections can be recorded over a longer period of time using a small amount of data.

The present invention may use the third memory section to temporarily store audio or image signals that precede the detection of user-input data. Thus, even if the audio or image signal was saved before the user input was received, the important sections can be stored in the limited storage medium with a relatively large amount of data, and the sections of the audio or image signal not in the important sections can be recorded over a longer period of time using a small amount of data.

In the present invention, the audio or image signal beginning with the detection of a detection interval by the condition-matching interval detection section and ending with the detection of user-input data by the user-input data detection section can be sent to the compression section. In this case, compression operations do not need to be performed until the user-input data detection section detects user-input data, which has the advantage of lightening the load on the device. Also, when the user-input data detection section detects user-input data, the audio or image signals stored in the third memory section can be erased. This has the advantage of keeping the memory capacity required of the third memory section to a minimum.

The audio or image signals from an interval beginning with the detection of the beginning of the detection interval by the condition-matching interval detection section and ending with the end of the detection interval detected by the condition-matching interval detection section (said interval including the point in time when the user-input data detection section detected user-input data), can be sent to the compression section. In this case, the need to send the output from the condition-matching interval detection section to the compression section is eliminated. This has the advantage of greatly simplifying the condition-matching interval detection section and the compression section.

Also, it is possible to use a separate memory section to temporarily store audio or image data entered while the compression section is performing compression operations as well as user-input data entered from the user-input data detection section. In this case, data can be stored without losing any of the audio or image signals and user-input data received while the compression section is performing compression operations.

It is possible to take the continuously incoming audio or image signals and store them in the third memory section while compressing the data. In this case, the compression section does not need to compress a large amount of audio or image signals at once. Also, the need for a memory section to temporarily store audio or image signals received during compression is eliminated or minimized.

In the present invention, when the continuously incoming audio or image signals exceed the memory capacity of the third memory section, then a prescribed section of the audio or image signals stored in the third memory section can be erased or sent to the compression for storage in the first memory section. This has the advantage of allowing input to continue even if the incoming audio or image signals exceed the memory capacity of the third memory section.

It is possible to use the condition-matching interval detection section detect the presence of incoming audio signals and the intervals of audio signals. In this case, it is possible to use high audio quality/high image quality for the recording of the audio or image signal from a speaker from beginning to end. It is also possible to rewind to the beginning of the statement and to begin playback from there.

It is possible to use the condition-matching interval detection section to determine the speaker of the incoming audio signal and to detect changes in speakers. In this case, it is possible to use high audio quality/high image quality to record audio or image signals from a specific speaker. Also, it is also possible to rewind the footage to the point in time when there was a change in speakers, and to begin playback from there.

It is possible to use the condition-matching interval detection section to detect the appearance in the incoming audio signal of a keyword entered beforehand. In this case, the sections of the audio or image signal in which keywords appear frequently can be recorded using high audio quality/high image quality. Also, it is possible to rewind the footage to the point in time when keywords appeared frequently, and to begin playback from there.

It is possible to use the condition-matching interval detection section to detect the appearance in the incoming audio signal of audio patterns entered beforehand. Even if it is difficult to detect keywords from the audio signal, characteristic audio patterns such as patterns of laughter, patterns of applause, patterns of excited conversation, and the like can be recognized. This makes it possible to record at high audio quality/high image quality the audio signals or image signals from intervals containing characteristic audio signals. Also, it is possible to rewind the footage to the point in time when the pattern was detected and to begin playback from there.

It is possible to use the condition-matching interval detection section to detect the appearance in incoming image signals of character strings entered beforehand. This makes it possible to record the audio or image signals from before and after the appearance of the strings entered beforehand at high audio quality/high image quality. Also, it is possible to rewind the footage to the point in time when the string appeared and to begin playback from there.

It is possible to use the condition-matching interval detection section to detect the appearance in the incoming image signal of change in state. Even if it is difficult to detect a string from an image signal, it is possible to detect changes in the state of the incoming image signal such as changes in brightness, changes in color distribution, characteristic amounts of change determined from image recognition, and the like. This makes it possible to record audio or image signals at high audio quality/high image quality before and after the occurrence of the event. Also, it is possible to rewind the footage to before the event was detected, and to begin playback from there.

Also, it is possible to use the condition-matching interval detection section to detect changes in state detected by an external sensor. Even if it is difficult to detect changes of state in the audio or image signal, or if a change of state that is not contained in the incoming audio or image signal takes place, it is possible to record the audio or image signals from before and after the event took place at high audio quality/high image quality. It is also possible to rewind the footage to before the event was detected, and to begin playback from there.

It is also possible to use the condition-matching interval detection section to detect a camera usage signal or changes in the camera usage signal. In cases where important audio or image data is being recorded using a close-up or the like, it is possible to record the audio or image data when the zoom-in is taking place at a high audio quality/high image quality. It is also possible to rewind the footage to before the zoom-in operation was performed, and to begin playback from there.

It is also possible to combine the detection results from the user-input data detection section and the condition-matching interval detection section to determine the degree of importance of the audio or image signals. Based on this degree of importance, it is possible to compress the audio or image signals by varying for certain sections of the data the compression ratio or the intervals used in interrupted recordings. In this case, it is possible to store image signals using compression ratios or intervals for interrupted recordings in accordance with complex events made up of a combination of various events.

It is possible to use the detection results from the user-input data detection section to determine the degree of importance of user-input data. The degree of importance is used as the basis for varying the sections for which compression is performed or for varying the magnitude of the compression ratio or interruption recording intervals. For example, when important data is entered with a red pen or the like, the section of the audio or image signal recorded when the important data is entered is recorded at a higher audio quality/higher image quality compared to other sections.

In ten embodiments described above, the intervals outside the condition-matching intervals were saved with higher compression ratios or with dropped frames. However, it would also be possible to leave out these intervals entirely from the recording.

As described above, according to the present invention, audio data or image data is stored in correspondence with user-input data. Audio data or image data is stored in memory, taking into account the point in time when user input was received, as well as the detection of intervals that match conditions set beforehand. Thus, user input, changes in audio signals, and changes in images are linked and the sections of the audio and image data that are believed to be important are saved reliably to memory.

While the invention has been described with reference to preferred embodiments, many modifications and variations are apparent from the description of the invention. All such modifications and variations are intended to be within the scope of the present invention as defined in the appended claims.

What is claimed is:

1. A data storage device comprising:
a user-input device;
a user-input data detector, coupled to the user-input device, that detects user-input data received from said user-input device;
an audio data input device that receives audio data;
an audio data memory, coupled to the audio data input device, that stores the received audio data;
an image data input device that receives image data;
a condition-matching interval detector, coupled to the audio data input device, that detects intervals in said received audio data that match prescribed conditions specified beforehand, said condition-matching interval detector detecting specific, pre-set keywords uttered by a speaker in said audio data, and uses said detection results to detect a beginning point and an ending point of the condition-matching interval;
a temporary memory, coupled to the image data input device, that temporarily stores said received image data in association with data indicating intervals detected by said condition-matching interval detector;
an image data memory, coupled to the temporary memory, that receives and stores an image data sequence from image data stored in said temporary memory in association with user-input data detected by said user-input data detector, said image data sequence comprising image data in an interval determined by said user-input data from said user-input data detector and by detection results from said condition-matching interval detector; and
a correspondence-relationship memory that stores relationships of said user-input data with memory positions within said image data memory of said received image data when said user-input data was detected and with memory positions of said audio data within said audio data memory.

2. The data storage device of claim 1, wherein when said user-input data detector detects said user-input data, said image data stored in said image data memory, comprises an image data sequence from image data stored in said temporary memory said image data sequence comprising image data beginning at least at a start of an interval detected by said condition-matching interval detector, said interval preceding detection of said user-input data.

3. The data storage device of claim 2, further comprising an image data compressor, coupled to the image data memory, that performs data compression of image data stored in said image data memory using a changeable compression method or compression ratio wherein said interval of said image data determined by detection results of said user-input data from said user-input data detector and detection results from said condition-matching interval detector is compressed by said image data compressor at a higher image quality compared to image data from other intervals.

4. The data storage device of claim 3, wherein said condition-matching interval detector compares an audio signal level from said audio data with a pre-set threshold value, and results of said comparison are used to detect a beginning point and an ending point of said condition-matching interval.

5. The data storage device of claim 3, wherein said condition-matching interval detector detects specific speakers or the switching of speakers in said incoming audio data, and said detection results are used to detect a beginning point and an ending point of said condition-matching interval.

6. The data storage device of claim 3, wherein said image data compressor determines a degree of importance for audio data or image data by combining detection results from said user-input data detector and said condition-matching interval detector, and audio data or image data is compressed using different compression methods or compression amounts based on said degree of importance, said audio data or image data comprising audio data or image data from an interval determined by detection results from said user-input data detector and said condition-matching interval detector.

7. A data storage device comprising:
a user-input device;
a user-input data detector, coupled to the user-input device, that detects user-input data received from said user-input device;
an audio data input device that receives audio data;
an audio data memory, coupled to the audio data input device, that receives and stores audio data from said audio data input device;
an image data input device that receives image data;
a condition-matching interval detector, coupled to the image data input device, that detects intervals in said image data from said image data input device that match prescribed conditions specified beforehand, said condition-matching interval detector detecting specific, pre-set image patterns added in said image data, and uses said detection results to detect a beginning point and an ending point for the condition matching interval;

a temporary memory, coupled to the image input device, that receives and temporarily stores said image data from said image data input device in association with data indicating intervals detected by said condition-matching interval detector;

an image data memory, coupled to the temporary memory, that receives and stores an image data sequence from image data stored in said temporary memory when said user-input data is detected, said image data sequence comprising image data from an interval beginning at least at a start of an interval detected by said condition-matching interval detector preceding detection of said user-input data; and a correspondence-relationship storage device that stores relationships of said user-input data with memory positions within said image data memory of said image data received when said user-input data was detected and with memory positions of said audio data within said audio data memory.

8. The data storage device of claim 7, wherein said image data input device comprises a video camera outputting an image signal and camera operation signals based on a user's manipulation of said camera, and said condition-matching interval detector analyzes said camera usage signals to determine camera operations, and detects a beginning point and an ending point for an interval in said image data that matches prescribed conditions.

9. A data compression/storage/playback device comprising:

a user-input device;

a user-input data detector, coupled to the user-input device, that detects user-input data received from said user-input device;

a data input device that receives audio data or image data;

a condition-matching interval detector, coupled to the data input device, that detects intervals in said audio data or said image data from said data input device that match prescribed conditions specified beforehand, said condition-matching interval detector detecting specific, pre-set keywords uttered by a speaker in said audio data, or specific, pre-set image patterns added in said image data, and uses said detection results to detect a beginning point and an ending point of the condition-matching interval;

a temporary memory, coupled to the data input device, that receives and temporarily stores said audio data or said image data from said data input device in association with data indicating intervals detected by said condition-matching interval detector;

a time-series data memory, coupled to the temporary memory, that stores an audio or image data sequence stored in said temporary memory in association with user-input data detected by said user-input data detector, said image data sequence comprising audio or image data from an interval determined by said user-input data from said user-input data detector and by detection results of said condition-matching interval detector;

a display device, coupled to the user-input detector, that displays said user-input data;

a correspondence-relationship memory that stores relationships between data specifying a display position on said display of said user-input data detected by said user-input data detector and memory positions within said time-series data memory of said audio or image data received when said user-input data was detected;

a specifying device, coupled to the display device, that specifies a display portion related to user-input data displayed on said display device; and a playback device, coupled to the audio data memory and the image data memory, that receives and plays a prescribed section of audio data or image data from memory positions in said image data memory and said audio data memory, said memory positions being determined by said user-input data indicated by said specifying device and by said relationships stored in said correspondence-relationship memory.

10. A data storage/playback device comprising:

a user-input device;

a user-input data detector, coupled to the user-input device, that detects user-input data received from said user-input device;

an audio data input device that receives audio data;

an audio data memory, coupled to the audio data input device, that receives and stores audio data from said audio data input device;

an image data input device that receives image data;

a condition-matching interval detector, coupled to the audio data input device, that detects intervals in said audio data from said audio data input device that match prescribed conditions specified beforehand, said condition-matching interval detector detecting specific, pre-set keywords uttered by a speaker in said audio data, and uses said detection results to detect a beginning point and an ending point of the condition-matching interval;

a temporary memory, coupled to the image data input device, that receives and temporarily stores said image data from said image data input device in association with data indicating intervals detected by said condition-matching interval detector;

an image data memory, coupled to the temporary memory, that stores an image data sequence stored in said temporary memory in association with user-input data detected by said user-input data detector, said image data sequence comprising image data from an interval determined by said user-input data from said user-input data detector and by detection results from said condition-matching interval detector;

a display device, coupled to the user-input data detector, that displays said user-input data;

a correspondence-relationship memory that stores data specifying a display position on said display device of said user-input data detected by said user-input data detector, and for storing memory positions within said image data memory of said image data received when said user-input data was detected and within said audio data memory of said audio data, and for storing relationships between said data and said user-input data;

a specifying device, coupled to the display device, that specifies a display portion related to user-input data displayed on said display device; and a playback device, coupled to the image data memory and the audio data memory, that receives and plays a prescribed section of audio data or image data from memory positions in said image data memory and said audio data memory said memory positions being determined by said user-input data indicated by said specifying device, and by said relationships stored in said correspondence-relationship memory.

11. A data storage/playback device comprising:

a user-input device;

a user-input data detector, coupled to the user-input device, that detects user-input data received from said user-input device;

a user input data memory, coupled to the user-input data detector, that receives and stores user-input data from said user-input device detected by said user-input data detector;

an audio data input device that receives audio data;

an audio data storage device, coupled to the audio data input device, that receive and stores audio data from said audio data input device;

an image data input device that receives image data;

a condition-matching interval detector, coupled to the image data input device, that detects intervals in said image data from said image data input device that matched prescribed conditions specified beforehand, said condition-matching interval detector detecting specific, pre-set image patterns added in said image data, and uses said detection results to detect a beginning point and an ending point for the condition matching interval;

a temporary memory, coupled to the image data input device, that receives and temporarily stores said image data from said image data input device in association with data indicating intervals detected by said condition-matching interval detector;

an image data memory, coupled to the temporary memory, that receives and stores an image data sequence from said temporary storage device when said user input is detected, said sequence beginning from at least the start of an interval detected by said condition-matching interval detector preceding detection of said user-input data;

a display device, coupled to the user-input data detector, that displays said user-input data;

a correspondence-relationship memory that stores data specifying a display position on said display device of said user-input data detected by said user-input data detector and for storing memory positions within said image data memory of said image data received when said user-input data was detected and within said audio data memory of said audio data, and for storing relationships between said data and said user-input data;

a specifying device, coupled to the display device, that specifies a display portion related to user-input data displayed on said display device; and a playback device, coupled to the image data memory and the audio data memory, that receives and plays a prescribed section of audio data or image data from memory positions in said image data memory and said audio data memory, said memory positions being determined by said user-input data indicated by said specifying device, and by said relationships stored in said correspondence-relationship memory.

12. A data storage device comprising:

a user-input device;

a user-input data detector, coupled to the user-input device, that detects user-input data received from said user-input device;

an audio data input device that receives audio data;

an image data input device that receives image data;

an image data memory, coupled to the image data input device, that receives and stores the received image data;

a condition-matching interval detector, coupled to the audio input device, that detects intervals in said received audio data that match prescribed conditions specified beforehand, said condition-matching interval detector detecting specific, pre-set keywords uttered by a speaker in said audio data, and uses said detection results to detect a beginning point and an ending point of the condition-matching interval;

a temporary memory, coupled to the audio data input device, that temporarily stores said received audio data in association with data indicating intervals detected by said condition-matching interval detector;

an audio data memory, coupled to the temporary memory, that stores an audio data sequence from audio data stored in said temporary memory in association with user-input data detected by said user-input data detector, said audio data sequence comprising audio data in an interval determined by said user-input data from said user-input data detector and by detection results from said condition-matching interval detector; and correspondence-relationship memory that stores relationships of said user-input data with memory positions within said audio data memory of said received audio data when said user-input data was detected and with memory positions of said image data within said image data memory.

13. A method for storing data in a data memory, comprising:

detecting user-input data received from a user-input device;

storing user-input data detected by the detecting step;

receiving audio data or image data;

detecting an interval in said audio data or said image data that match prescribed conditions specified beforehand, the conditions being specific, pre-set keywords uttered by a speaker in said audio data, or specific, pre-set image patterns added in said image data, and uses said detection results to detect a beginning point and an ending point of the condition-matching interval;

temporarily storing said audio data or said image data in association with data indicating said detected interval;

storing an audio data or image data sequence from data stored in the temporary storing step, said sequence comprising an interval determined by detection of said user-input data by the user-input data detecting step and by the interval detected by the interval detecting step, said sequence stored in association with said user-input data detected by the user-input data detecting step;

storing relationships between said user-input data detected by the user-input data detecting step and memory positions corresponding to said user-input data.

14. The method of claim 13, further comprising:

compressing audio data or image data stored in the sequence storing step using a changeable compression method or compression ratio wherein audio data or image data from an interval determined by said user-input data detection step and by the interval detected by the interval detection step is compressed by said compressing step using a compression method or compression ratio different from that used for audio data or image data from other intervals.

15. A method for storing data in a data memory, comprising:

detecting user-input data received from a user-input device;

receiving audio data;

storing the received audio data;

receiving image data;

detecting intervals in said received audio data that match prescribed conditions specified beforehand, the conditions being specific, pre-set keywords uttered by a speaker in said audio data, and uses said detection results to detect a beginning point and an ending point of the condition-matching interval;

temporarily storing said received audio data in association with data indicating intervals detected in the interval detecting step;

storing an image data sequence from image data stored in said temporary storing step in association with user-input data detected in said user-input data detecting step, said image data sequence comprising image data in an interval determined by said user-input data detected in said user-input data detecting step and by the interval detected in the interval detecting step; and storing relationships of said user-input data with memory positions of said stored image data stored when said user-input data was detected and with memory positions of said stored audio data.

16. The method of claim 15, wherein when said user-input data is detected in the detecting step, said image data stored in said image data storing step comprises an image data sequence from image data stored in said temporary storing step, said image data sequence comprising image data beginning at least at a start of an interval detected in the interval detecting step, said interval preceding detection of said user-input data.

* * * * *